United States Patent
Harding et al.

(10) Patent No.: US 7,128,997 B2
(45) Date of Patent: Oct. 31, 2006

(54) METHOD AND SYSTEM FOR DISPENSING PELLETIZED FUEL FOR USE WITH A FUEL CELL

(75) Inventors: Philip H. Harding, Albany, OR (US); Louis C. Barinaga, Vancouver, WA (US); John C. Greeven, Corvallis, OR (US); Paul H. McClelland, Monmouth, OR (US); Joseph W. Tsang, Corvallis, OR (US); Makarand Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 10/697,343

(22) Filed: Oct. 30, 2003

(65) Prior Publication Data

US 2005/0095470 A1 May 5, 2005

(51) Int. Cl.
*H01M 8/00* (2006.01)
*H01M 2/00* (2006.01)
*C01B 6/00* (2006.01)
*B65D 83/04* (2006.01)
*B65D 85/00* (2006.01)

(52) U.S. Cl. ............... 429/34; 429/35; 429/20; 423/644; 423/645; 423/646; 423/647; 423/658.2; 206/528; 206/531; 206/535; 206/503; 206/504; 221/92; 221/103; 221/104; 222/4; 252/188.25; 252/188.26; 48/118.5

(58) Field of Classification Search ............ None
See application file for complete search history.

(56) References Cited

U.S. PATENT DOCUMENTS

| | | | | |
|---|---|---|---|---|
| 1,992,579 A | * | 2/1935 | Pearson | 221/232 |
| 3,459,510 A | * | 8/1969 | Litz et al. | 422/113 |
| 4,512,500 A | * | 4/1985 | Belbin, Sr. | 221/82 |
| 5,207,899 A | * | 5/1993 | Boyle | 210/138 |
| 5,468,446 A | | 11/1995 | Morgan et al. | |
| 5,508,778 A | * | 4/1996 | Barre et al. | 396/622 |
| 5,728,464 A | | 3/1998 | Checketts | |
| 5,817,157 A | | 10/1998 | Checketts | |
| 5,833,934 A | * | 11/1998 | Adlhart | 422/239 |
| 6,506,360 B1 | | 1/2003 | Andersen et al. | |
| 6,889,869 B1 | * | 5/2005 | Hallin | 221/223 |
| 6,932,847 B1 | * | 8/2005 | Amendola et al. | 48/76 |
| 6,955,863 B1 | * | 10/2005 | Bean et al. | 429/96 |
| 2002/0164521 A1 | * | 11/2002 | Wessel et al. | 429/40 |
| 2004/0047801 A1 | * | 3/2004 | Petillo et al. | 423/657 |
| 2005/0036941 A1 | * | 2/2005 | Bae et al. | 423/658.2 |
| 2005/0074643 A1 | * | 4/2005 | Adams et al. | 429/19 |

* cited by examiner

*Primary Examiner*—Joseph D. Anthony

(57) ABSTRACT

Representative embodiments provide for a fuel activation device including a fuel storage chamber configured to store a plurality of fuel pellets arranged as a stack. A fuel dispensing device is configured to transport a fuel pellet to a fuel activation chamber. A spring is configured to advance the fuel pellets toward the fuel dispensing device as one or more fuel pellets are removed from the stack. A fuel initiator is configured to activate a release of hydrogen gas from the transported fuel pellet. The fuel activation device is configured to provide the hydrogen gas to a fuel cell through a gas vent. A method is provided including providing a plurality of fuel pellets arranged as a spring-loaded stack, transporting a fuel pellet from the stack, activating a release of hydrogen gas from the transported fuel pellet, and providing the hydrogen gas to a fuel cell.

13 Claims, 10 Drawing Sheets

METHOD AND SYSTEM FOR DISPENSING PELLETIZED FUEL FOR USE WITH A FUEL CELL

BACKGROUND

A wide variety of portable and/or remotely located electrically powered devices are known in the electrical and related arts. Examples of such devices include, for example, cellular phones, laptop computers, personal digital assistants (PDAs), still and/or video cameras, radio repeater equipment, pump and hoist motors, electric land vehicles, aerospace equipment, etc. These and other similar electrical devices are powered by a number of different kinds of electrical energy sources. Non-limiting examples of such electric energy sources include storage batteries, primary cell batteries, charged capacitors, photovoltaic cells, etc.

Generally, it is an ongoing pursuit of the electrical arts to decrease the overall size and weight of portable and/or remotely located electrically powered devices, while simultaneously increasing the total electrical energy (i.e., device running time) that is available from the corresponding electrical energy source. Furthermore, another general pursuit of the electrical arts is to provide electrical energy sources that can be recharged or 'refreshed' in as short a period of time as possible.

One type of electrical energy source that is being increasingly utilized toward these goals is the fuel cell. Broadly speaking, fuel cells are electrochemical devices that consume fuel (commonly in the form of gaseous hydrogen) and oxygen (commonly extracted from ambient air), and convert these materials into usable quantities of electrical energy and water, wherein most or all of the water is typically eliminated as a waste product. Fuel cells generally exhibit a number of relative advantages over some other kinds of portable or remote use electrical energy sources. Such advantages can include, for example: relatively fast refueling times; construction from environmentally inert or 'benign' materials; relatively long usable lives; the use of hydrogen fuel derivable from a variety of abundant resources; waste water discharge is non-toxic; etc.

Because fuel cells consume fuel (i.e., hydrogen) during operation, this fuel resource must be replenished over time. As it is generally desirable to keep fuel cell systems as lightweight and compact as possible, it is also desirable to provide mechanisms and methods for delivering fuel resources to these fuel cell systems that are correspondingly compact and easy to use.

Therefore, it is desirable to provide fuel storage and delivery mechanisms and methods for use with fuel cells that exhibit reduced weight and size and that provide improved ease of use relative to the prior art.

SUMMARY

The embodiments herein disclosed are for illustrative purposes and should not be construed as limiting the invention.

One embodiment of the present invention provides for a fuel pellet package for use with a fuel activation device for a fuel cell. The fuel pellet package includes a packaging, and a hermetically sealed envelope supported within the packaging. The fuel pellet package also includes a plurality of fuel pellets, each pellet including, hydrogen that is releasable by the fuel activation device. Furthermore, the fuel pellets are arranged as a stack within the hermetically sealed envelope. Also included is a spring configured to exert a force coupled to the fuel pellets.

Another embodiment of the present invention provides a fuel activation device for use with a fuel cell. The fuel activation device includes a fuel activation chamber and a fuel storage chamber. The fuel storage chamber is configured to store a plurality of fuel pellets that are arranged as a stack. The fuel activation device also includes a fuel dispensing device that is configured to selectively transport a fuel pellet from the stack of fuel pellets to the fuel activation chamber in response to a dispensing input. The fuel activation device also includes a spring configured to advance the fuel pellets toward the fuel dispensing device, in response to a removal of one or more fuel pellets from the stack. The fuel activation device further includes a fuel initiator supported in the fuel activation chamber. The fuel initiator is configured to activate a release of hydrogen gas from the transported fuel pellet. Furthermore, the fuel activation chamber is also configured to provide the hydrogen gas to the fuel cell through a gas vent.

Still another embodiment of the present invention provides a method of providing hydrogen to a fuel cell. The method includes providing a plurality of fuel pellets including hydrogen, and arranging the plurality of fuel pellets as a spring-loaded stack. The method also includes transporting a fuel pellet from the stack, activating a release of hydrogen gas from the transported fuel pellet, and providing the hydrogen gas to the fuel cell.

Yet another embodiment provides for a method of packaging fuel pellets, the method including providing a packaging, wherein the packaging defines a chamber. The method also includes supporting a impermeable material within the chamber, and supporting a plurality of fuel pellets as a stack substantially within the impermeable material. The fuel pellets include hydrogen. The method further includes sealing the impermeable material, thus defining a hermetically sealed envelope about the plurality of fuel pellets. The method also includes sealing the chamber about the hermetically sealed envelope.

These and other aspects and embodiments of the present invention will now be described in detail with reference to the accompanying drawings, wherein:

DESCRIPTION OF THE DRAWINGS

FIG. 2A is a side elevation sectional view depicting a fuel pellet package in accordance with yet another embodiment of the present invention.

FIG. 2AA is side elevation sectional view depicting a fuel pellet package in accordance with still another embodiment of the present invention.

DETAILED DESCRIPTION

Figure 1:
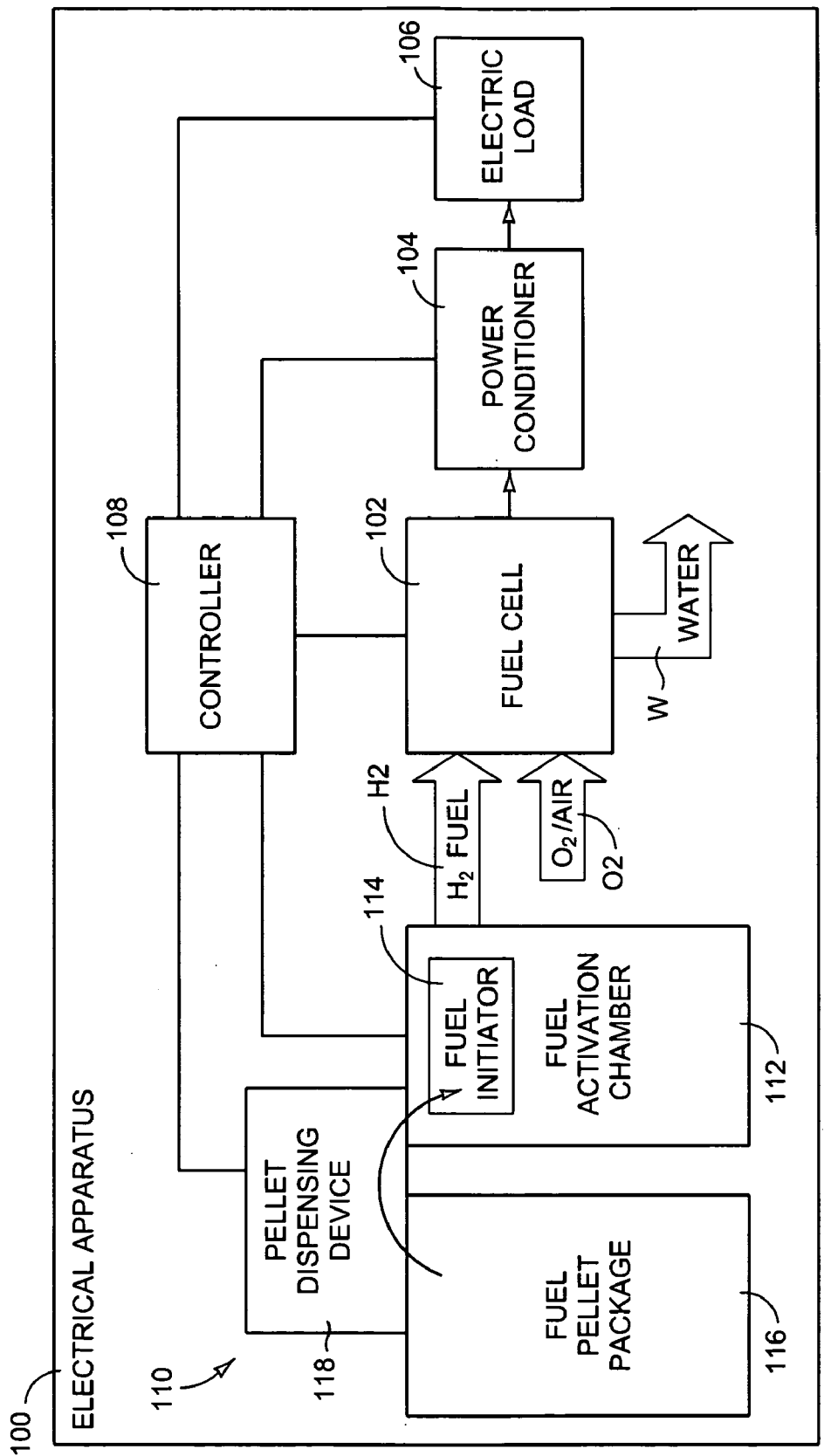
FIG. 1 is a block diagram depicting an electrical apparatus in accordance with one embodiment of the present invention.

In representative embodiments, the present teachings provide methods and apparatus for packaging, dispensing and activating hydrogen-containing fuel for use with fuel cells.

The present invention can be generally summarized as follows: various embodiments of fuel pellet packages are provided that store a plurality of substantially solid fuel pellets containing hydrogen. Each of the fuel pellets is configured to release the hydrogen as a gas in response to a suitable activation (i.e., fuel initiator) such as contact with an acidic liquid, heating, or the provision of electrical energy to the fuel pellet, to name but a few examples. The various packages support (i.e., house) a plurality of like fuel pellets substantially as a spring-loaded stack and can also include various structural elements to prevent the undesired release of hydrogen from the fuel pellets and/or to protect the fuel pellets against physical damage. Such preventive and protective structural elements can include desiccant material, passivating material, hermetically sealed envelopes, etc.

Furthermore, a fuel pellet package in accordance with embodiments of the present invention are configured to be suitably openable such that the fuel pellets supported therein can be utilized for the release of hydrogen fuel. Such openable configurations include perforations about the packaging and/or hermetically sealed envelope, selection of packaging or envelope materials that can be selectively cut open by way of cooperation with a suitable fuel activation device (described hereafter), etc. In general, the fuel pellet packages of the present invention provide respective unitary sources of hydrogen fuel that are relatively convenient to store, transport, and use in conjunction with fuel activation devices of the present invention.

The present invention further provides various embodiments of fuel activation devices that are respectively configured to controllably activate the released hydrogen gas from the particular type of fuel pellet with which each is configured to operate, in response to a suitable control signal or signals provided by a corresponding controller. Thus, various fuel activation devices are provided that respectively include acidic-liquid-type, heater-type, and electrical-type activation mechanisms, to name but a few examples, all generally referred to as fuel initiators. The fuel activation devices also include a suitable pellet dispensing device that is signal-controllable by a controller to selectively transport a fuel pellet from a fuel storage chamber of the fuel activation device to a fuel activation chamber, and, ultimately, to the fuel initiator of the fuel activation device. The fuel activation devices are further configured to provide the fuel pellet-released hydrogen gas to a fuel cell by way of a suitable gas vent.

Certain fuel activation devices of the present invention are suitable for use regardless of their orientation with respect to the direction of gravity, while still other embodiments operate satisfactorily in any orientation relative to the direction of gravity. Furthermore, particular fuel activation devices of the present invention are configured to be refillable or rechargeable through cooperative use of corresponding fuel pellet packages of the present invention. Still other embodiments of the fuel activation devices are generally configured to be disposable and are appropriately discarded upon exhaustion of their inherent (i.e., original) fuel pellet supply.

The pellet dispensing devices of the present invention can be defined by any of a generally broad range of embodiments, such as linear actuator type devices, auger type devices, ratchet wheel type devices, feed magazine or rotating belt types devices, etc. In general, the pellet dispensing devices of the present invention can be any generally electromechanical assemblage that is configured to selectively transport fuel pellets of the present invention from a storage chamber and into an activation chamber.

Turning now to FIG. 1, a block diagram depicts an electrical apparatus 100 in accordance with one embodiment of the present invention. The electrical apparatus 100 includes a fuel cell 102. The fuel cell 102 can be defined by any fuel cell type suitable for use with the electrical apparatus 100. As depicted in FIG. 1, the fuel cell 102 is assumed to be a proton exchange membrane (PEM) type fuel cell. In another embodiment (not shown), the fuel cell 102 is another suitable fuel cell type. The fuel cell 102 is generally configured to consume hydrogen fuel ("H2") and oxygen ("O2") and to generate usable amounts of electrical power (i.e., electrical energy), while also producing water ("W") as a waste product. Further description of the performance of the fuel cell 102 is provided hereafter.

The electrical apparatus 100 also includes a power conditioner 104. The power conditioner 104 is electrically coupled to the fuel cell 102. The power conditioner 104 can be defined by any suitable electrical and/or electronic circuitry that is configured to receive electrical power generated by the fuel cell 102 and to suitably condition that electrical power prior to providing it to an electric load 106 (described hereafter). Non-limiting examples of such electrical power conditioning can include: voltage boosting, bucking, or other voltage regulation; noise filtering; voltage sag or voltage spike filtering; direct-current to alternating-current inversion; over-current protection; fuel cell shunting; etc. Any suitable combination of these or other forms of electrical power conditioning can be provided by a correspondingly configured embodiment of the power conditioner 104 to satisfy the power requirements of the electric load 106 and/or to protect the fuel cell 102 from electrically-related damage.

The electric load 106 (introduced above) is electrically coupled to the power conditioner 104 and can include any suitable electrical and/or electronic devices or circuitry required for the normal operation of the electrical apparatus 100. Non-limiting examples of such electrical and/or electronic devices or circuitry can include: motors; solenoids; relays; electro-optics; microprocessors and/or microcontrollers; heating elements; radio frequency circuitry; data storage devices; state machines; measurement and/or control instrumentation; operator interface devices; etc. In general, the electric load 106 can be defined by any electrically energized device, devices, and/or circuitry associated with the normal use and function of the electrical apparatus 100.

The electrical apparatus 100 also includes a controller 108. The controller 108 is coupled in electrical and/or signal communication with the fuel cell 102. The controller 108 can be defined by any suitable electrical and/or electronic circuitry that is configured to monitor one or more operating parameters of the fuel cell 102 (such as, for example, temperature, cell voltage, cell humidity, etc.), and to provide control signals and/or power to the fuel cell 102 and other devices of the apparatus 100 in correspondence to the normal operation of the fuel cell 102. Thus, the controller 108 is suitably coupled in control and/or monitoring signal communication with the fuel cell 102, the power conditioner 104 and the electric load 106.

The controller 108 can include, for example: a microprocessor or a microcontroller; digital, analog, and/or hybrid circuitry; solid-state and/or electromechanical switching devices; a storage battery; one or more ultra-capacitors; sensing instrumentation; etc. One of skill in the electronic control arts can appreciate that various embodiments of the controller 108 can be defined as required or desired in correspondence with a particular embodiment of the electrical apparatus 100 and that further elaboration is not necessary for an understanding of the present invention.

The electrical apparatus 100 further includes a fuel activation device (hereafter, "FAD") 110 in accordance with the present invention. The FAD 110 includes a fuel activation chamber 112. The fuel activation chamber 112 includes (i.e., supports) a fuel initiator 114. The fuel initiator 114 is generally configured to receive substantially solid fuel pellets (not shown in FIG. 1) that include hydrogen, and to initiate (i.e., activate or trigger) and/or perpetuate a release of the hydrogen as a gas from the received fuel pellets into the fuel activation chamber 112. The particular form of the fuel initiator 114 varies in correspondence to the particular type of fuel pellet (not shown) to be activated, and further elaboration is provided hereafter in regard to particular embodiments of the present invention.

The FAD 110 also includes a fuel pellet package 116. The fuel pellet package 116 contains (i.e., includes or supports) a plurality of the fuel pellets (not shown), introduced above. The fuel pellet package 116 is can be substantially configured to protect the fuel pellets against accidental or otherwise unintentional activation (i.e., hydrogen gas release) until so desired, and to provide protection against physical damage or breakage of the fuel pellets contained therein. Furthermore, the fuel pellet package 116 is configured to provide a unitary source of hydrogen fuel that is convenient to store, transport, and utilize in conjunction with the fuel initiator 114 of the fuel activation chamber 112.

The FAD 110 further includes a pellet dispensing device 118. The pellet dispensing device 118 is configured to selectively transport a fuel pellet (not shown in FIG. 1) from the fuel pellet package 116 to the fuel initiator 114 of the fuel activation chamber 112 in response to a corresponding signal from the controller 108. The pellet dispensing device 118 can include any suitable electromechanical assembly for such controllable fuel pellet transportation. Non-limiting examples of the pellet dispensing device 118 include: a push element (pusher) and linear actuator device; a pusher and solenoid type device; an auger type device; a ratcheting wheel type device; a rotary magazine or 'belt' type device; etc. One of skill in the electromechanical arts can appreciate that a number of such suitable pellet dispensing devices 118 can be defined and that further elaboration is not required herein.

Typical operation of the electrical apparatus 100 is as follows: the controller 108 is assumed to receive a user input or other suitable signal indicating that operation of the electrical load 106 is required. The controller 108 then issues a control signal to the pellet dispensing device 118 causing it to transport a fuel pellet (not shown in FIG. 1) from the fuel pellet package 116 to the fuel initiator 114. The controller 108 also issues a corresponding signal to the fuel initiator 114, as required, causing it to initiate and/or perpetuate a release of hydrogen gas from the fuel pellet just received by the fuel initiator 114 from the pellet dispensing device 118.

Next, hydrogen gas is released by the fuel pellet (not shown) presently in cooperation with the fuel initiator 114. The hydrogen gas flows into the fuel activation chamber 112 and is then fluidly coupled from the fuel activation chamber 112 to the fuel cell 102 as hydrogen gas $H_2$ by way of a suitable fluid conduit (not shown). The controller 108 then causes the fuel cell 102 to enter an active (i.e., electrical generating) state. The fuel cell 102 responds by consuming the hydrogen gas $H_2$ and ambient oxygen $O_2$, and in turn generates electrical power. The fuel cell 102 also produces waste water, W, as a result of the electrical generating process.

The controller 108 causes the power conditioner 104 to receive electrical power generated by the fuel cell 102 and to condition the electrical power as required for use by the electrical load 106. The conditioned power is in turn provided to the electrical load 106, which uses (i.e., consumes, or is energized by) the conditioned power while performing its normal function or functions under the signal control of the controller 108.

As operation progresses, the fuel pellet (not shown) presently engaged by the fuel initiator 114 becomes substantially depleted of its hydrogen content and is generally considered consumed or spent. The controller 108 detects this depletion by any of a number of suitable ways, such as, for example, by direct gas concentration sensing within the fuel activation chamber 112 or fuel cell 102, by measurement of the fuel cell terminal (i.e., output or generated) voltage, etc.

In any case, the controller 108 responds to this hydrogen depletion detection by causing the pellet dispensing device 118 to transport another fuel pellet (not shown in FIG. 1) from the fuel pellet package 116 to the fuel initiator 114. The controller 108 further causes, as required, the fuel initiator 114 to initiate and/or perpetuate the release of hydrogen gas $H_2$ from the newly received fuel pellet.

This process continues substantially as described above as one fuel pellet after another is utilized for the production of hydrogen gas, $H_2$, for consumption by the fuel cell 102. For purposes of example, it is assumed that the controller 108 eventually receives an 'off' or 'shut-down' user input or signal. The controller 108 responds to such an input (signal) by causing the fuel cell 102, the power conditioner 104, and/or the electric load 106 to execute a power-down or deactivation sequence as required and to enter a substantially de-energized or standby state. The controller 108 further responds to such an input by causing the pellet dispensing device 118 to halt the transportation of fuel pellets from the fuel pellet package 116 to the fuel initiator 114, and further causes the fuel initiator 114 to shut-down or otherwise enter a generally stopped condition. Normal operation of the electrical apparatus 100 is now considered complete for the present time until a future user input or a signal to the controller 108 causes the normal operation to be repeated substantially as described above.

The electrical apparatus 100 is understood to be, within the scope of the present invention, any electrical apparatus that includes a suitable embodiment of the fuel activation device 110, or any combination of other embodiments in accordance with the present invention. A number of such embodiments of the present invention are described in detail hereafter.

Figure 2:
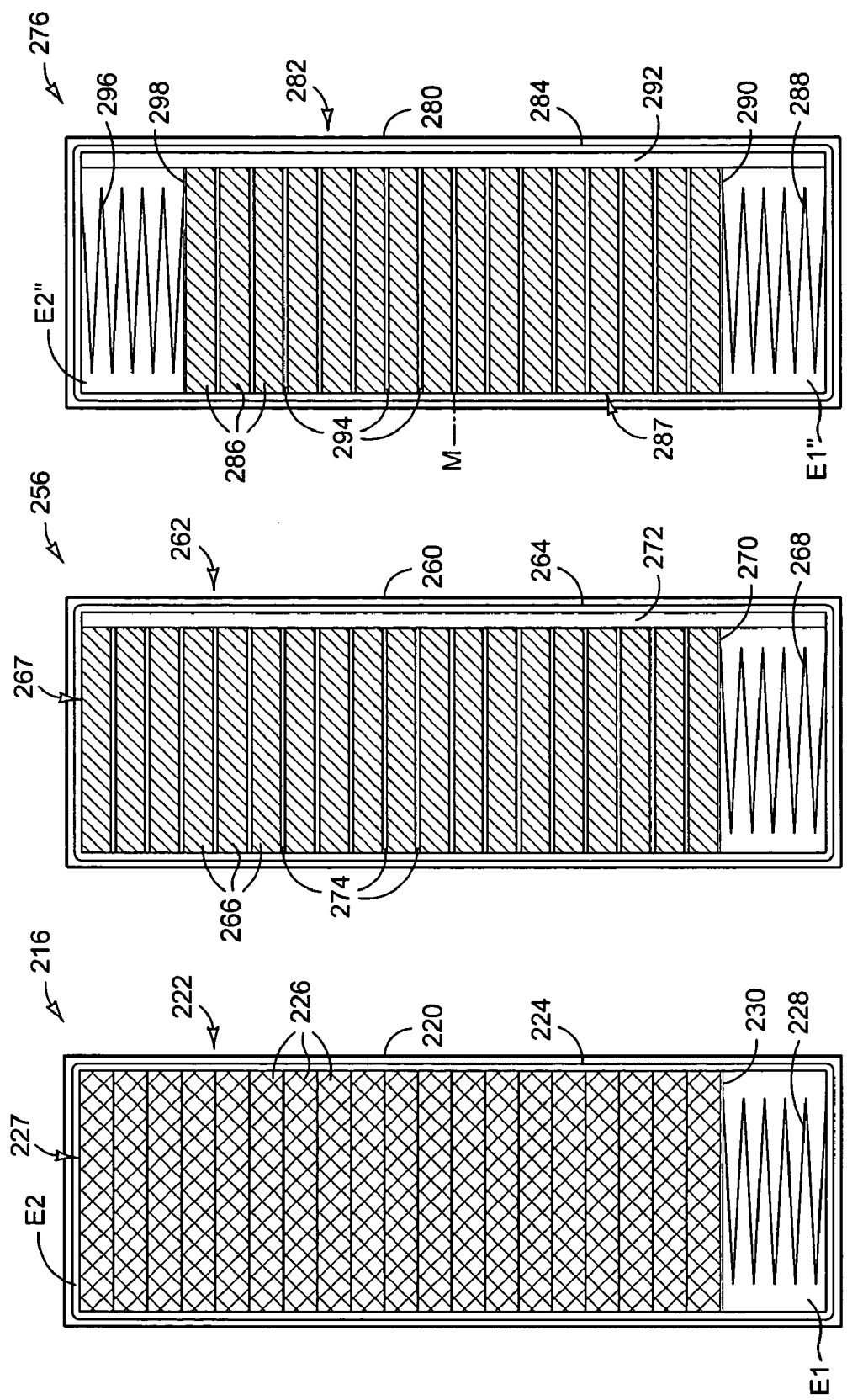
FIG. 2 is a side elevation sectional view depicting a fuel pellet package in accordance with another embodiment of the present invention.

FIG. 2 is a side elevation sectional view of a fuel pellet package 216 in accordance with another embodiment of the present invention. The fuel pellet package 216 includes a packaging 220. The packaging 220 can be formed from any suitable substantially rigid material such as, for example, plastic, metal, etc. As depicted in FIG. 2, the packaging 220 is configured to define a generally elongated inner chamber 222 of substantially rectangular cross-section. Other geometries corresponding to other embodiments of the fuel pellet package 216 can also be used. The packaging 220 is generally configured to protect fuel pellets (described hereafter) supported within the inner chamber 222 against breakage or similar damage.

The fuel pellet package 216 depicted in FIG. 2 also includes a hermetically sealed envelope (hereafter, envelope) 224 of substantially the same geometry as the inner chamber 222. That is, the respective overall shapes and volumes of the inner chamber 222 and the envelope 224 are in generally close correspondence with each other. The envelope 224 can be formed from any suitable impermeable material such as, for example, plastic, Mylar®, etc. (Mylar® is a registered mark owned by E. I. Du Pont de Nemours and Company, of Wilmington, Del.) The envelope 224 is configured to prevent contamination (i.e., oxygen, water, etc.) from entering the inside of the envelope 224.

The fuel pellet package 216 further includes a plurality of fuel pellets 226. The fuel pellets 226 are substantially solid and include a hydrogen-containing compound such as, for example, $NaBH_4$ or $CaH_4$. Other suitable hydrogen containing compounds can also be used. For example, the fuel pellets 226 can include a compound such as a zeolite that absorbs hydrogen from a predefined source (not shown) and then releases the hydrogen as a gas when heated. Each of the fuel pellets 226 has a cross-sectional shape that typically and generally corresponds to that of the inner chamber 222. As depicted in FIG. 2, each of the fuel pellets 226 is generally in the shape of a wafer or platelet. Other suitable shapes can also be used. In any case, the plurality of fuel pellets 226 are substantially arranged to define a stack 227.

Each of the fuel pellets 226 is configured to release hydrogen as a gas in response to a particular type of activation corresponding to that particular type of fuel pellet 226. In one embodiment, the fuel pellets 226 are configured to release hydrogen gas in response to being heated. In another embodiment, the fuel pellets 226 include an electrically conductive outer coating (not shown in FIG. 2) that causes the release of the hydrogen gas in response to the application of electrical energy to (i.e., passage of electrical current through) the electrically conductive outer coating. Other forms of the fuel pellet 226 corresponding to other types of activation can also be used.

The fuel pellet package 216 also includes a spring 228 and a contact plate 230. As depicted in FIG. 2, the spring 228 and the contact plate 230 are respectively disposed generally toward an end "E1" of the inner chamber 222. The spring 228 and the contact plate 230 can be respectively formed from any suitable material such as, for example, metal, plastic, etc. The spring 228 is configured to exert a force coupled to the stack 227 of the fuel pellets 226 by way of the contact plate 230. In this way, the spring 228 is configured to bias or urge the stack 227 of fuel pellets 226 in a predefined direction generally away from the spring 228 and toward the end "E2". As depicted in FIG. 2, this direction is substantially collinear with the longitudinal axis of the packaging 220. Although the spring 228 is depicted in FIG. 2 as being a coil spring, other types of "springs" can be used, as for example, an expansible bladder, a leaf spring, compressed gas, etc. In general, the "spring" 228 is any device which exerts a force on the stack 227 of fuel pellets 226 to thereby bias or urge the stack 227 of fuel pellets 226 in a predefined direction generally away from the "spring" and toward the end "E2".

The packaging 220 and the envelope 224 of the fuel pellet package 216 are each configured to be opened (not shown in FIG. 2) in response to a predefined action so that use (i.e., activation and consumption) of the fuel pellets 226 supported therein can be performed. In one embodiment, the packaging 220 and the envelope 224 are each configured to be opened manually by a user as desired. In another embodiment, the packaging 220 and the envelope 224 are respectively configured to be opened through mechanical cooperation with a corresponding fuel activation device (such as the FAD 110 of FIG. 1). Other configurations including other opening strategies can also be used. The location of such openings is generally at the end E2 such that the force exerted on the stack 227 by the spring 228 serves to advance the fuel pellets 226 toward the openings as the fuel pellets 226 are consumed (i.e., transported away) during use.

The fuel pellet package 216 generally defines a unitary source of hydrogen fuel that is configured for use with fuel activation devices of the present invention (for example, the fuel activation device 110 of FIG. 1). Furthermore, the fuel pellet package 216 is configured for relative ease of use, as well as convenience while storing and transporting.

FIG. 2A is a side elevation sectional view depicting a fuel pellet package 256 in accordance with still another embodiment of the present invention. The fuel pellet package 256 includes a packaging 260 defining an inner chamber 262, a hermetically sealed envelope 264, a spring 268, and a contact plate 270 that are defined, configured and cooperative substantially as described above in regard to the packaging 220 defining the inner chamber 222, the hermetically sealed envelope 224, the spring 228, and the contact plate 230, respectively, of the fuel pellet package 216 of FIG. 2.

The fuel pellet package 256 further includes a plurality of fuel pellets 266 arranged as stack 267. The fuel pellets 266 are substantially solid and include a hydrogen-containing compound such as, for example, $NaBH_4$ or $CaH_4$. Other suitable hydrogen-containing compounds can also be used (e.g., a zeolite, etc.). Each of the fuel pellets 266 is configured to release hydrogen as a gas in response to contact with (i.e., immersion within) a suitable activation liquid, typically slightly-acidic water. By slightly-acidic water, it is meant a hydrous solution having a pH in the range of about 4 to about 7. In another embodiment, an activation liquid including (containing) a suitable catalyst is used. Other suitable activation liquids can also be used. During immersion-type activation, the hydrogen gas typically forms bubbles that rise out of the activation liquid and are fluidly routed away for consumption by a fuel cell (not shown in FIG. 2A, see fuel cell 102 of FIG. 1).

The fuel pellet package 256 further includes a desiccant 272. The desiccant 272 can be formed from any suitable moisture (i.e., water) absorbing desiccant material such as, for example, silica gel. Other suitable forms of desiccant 272 can also be used. As depicted in FIG. 2A, the desiccant 272 is substantially configured as a strip that extends alongside the stack 267 of the fuel pellets 266. In this way, the desiccant 272 is generally configured to absorb moisture away from the fuel pellets 266, thus protecting the fuel pellets 266 against undesired activation of the hydrogen gas release. Other configurations of desiccant 272 can also be used.

The fuel pellet package 256 further includes a passivating material 274. As depicted in FIG. 2A, the passivating material 274 is disposed as relatively thin layers between adjacent ones of the fuel pellets 266 within the stack 267. The passivating material 274 is generally configured to prevent undesired (i.e., premature or in-the-package) release of hydrogen gas from the fuel pellets 266 due to exposure to an activation liquid. The passivating material 274 can also be configured to provide general protection against shock damage to the fuel pellets 266 due to, for example, dropping the fuel pellet package 256 on a hard surface or rough handling during transportation. The passivating material 274 can include, for example, a gel-forming material, an acid-neutralizing or caustic material, etc. Other suitable forms of passivating material 274 can also be used.

The fuel pellet package 256 generally defines a unitary source of hydrogen fuel that is configured for use with fuel activation devices of the present invention (for example, the fuel activation device 110 of FIG. 1). Furthermore, the fuel pellet package 256 is configured to provide benefits and desirable characteristics similar to those described above in regard to the fuel pellet package 216 of FIG. 2.

FIG. 2AA is a side elevation sectional view depicting a fuel pellet package 276 in accordance with still another embodiment of the present invention. The fuel pellet package 276 includes a packaging 280 defining an inner chamber 282, a hermetically sealed envelope 284, a plurality of fuel pellets 286 arranged as a stack 287, a first spring 288, a first contact plate 290, a desiccant 292, and a passivating material 294 that are defined, configured and cooperative substantially as described above in regard to the packaging 260 defining the inner chamber 262, the hermetically sealed envelope 264, the plurality of fuel pellets 266 arranged as the stack 267, the spring 268, the contact plate 270, the desiccant 272, and the passivating material 274, respectively, of the fuel pellet package 256 of FIG. 2A.

The fuel pellet package 276 further includes a second spring 296 and a second contact plate 298. The second spring 296 and the second contact plate 298 can be respectively formed from any suitable material such as, for example, plastic, metal, etc. As depicted in FIG. 2AA, the second spring 296 and the second contact plate 298 are respectively disposed generally toward an end "E2" of the inner chamber 282 and are cooperatively configured to exert a force against the stack 287 of fuel pellets 286 in a direction substantially opposite to that of the first spring 288 and first contact plate 290. That is, the first spring 288 is configured to urge (bias) the stack 287 generally toward the end "E2", while the second spring 296 is configured to urge the stack 287 toward the end depicted as "E1" in FIG. 2AA.

In this way, the first spring 288 and the second spring 296 cooperate to urge the stack 287 of fuel pellets 286 generally toward a midpoint "M" of the fuel pellet package 276. The packaging 280 and the hermetically sealed envelope 284 are each configured to be opened at a location generally coincident with the midpoint M, such that the fuel pellets 286 can be selectively removed from the fuel pellet package 276 (say, by a suitable pellet dispensing device such as 118 of FIG. 1) during the eventual release and consumption of the hydrogen gas produced by the fuel pellets 286.

Therefore, the fuel pellet package 276 provides yet another embodiment of a unitary hydrogen source that is configured for relatively convenient use with a suitable fuel activation device (such as the FAD 110 of FIG. 1) of the present invention.

Figure 3:
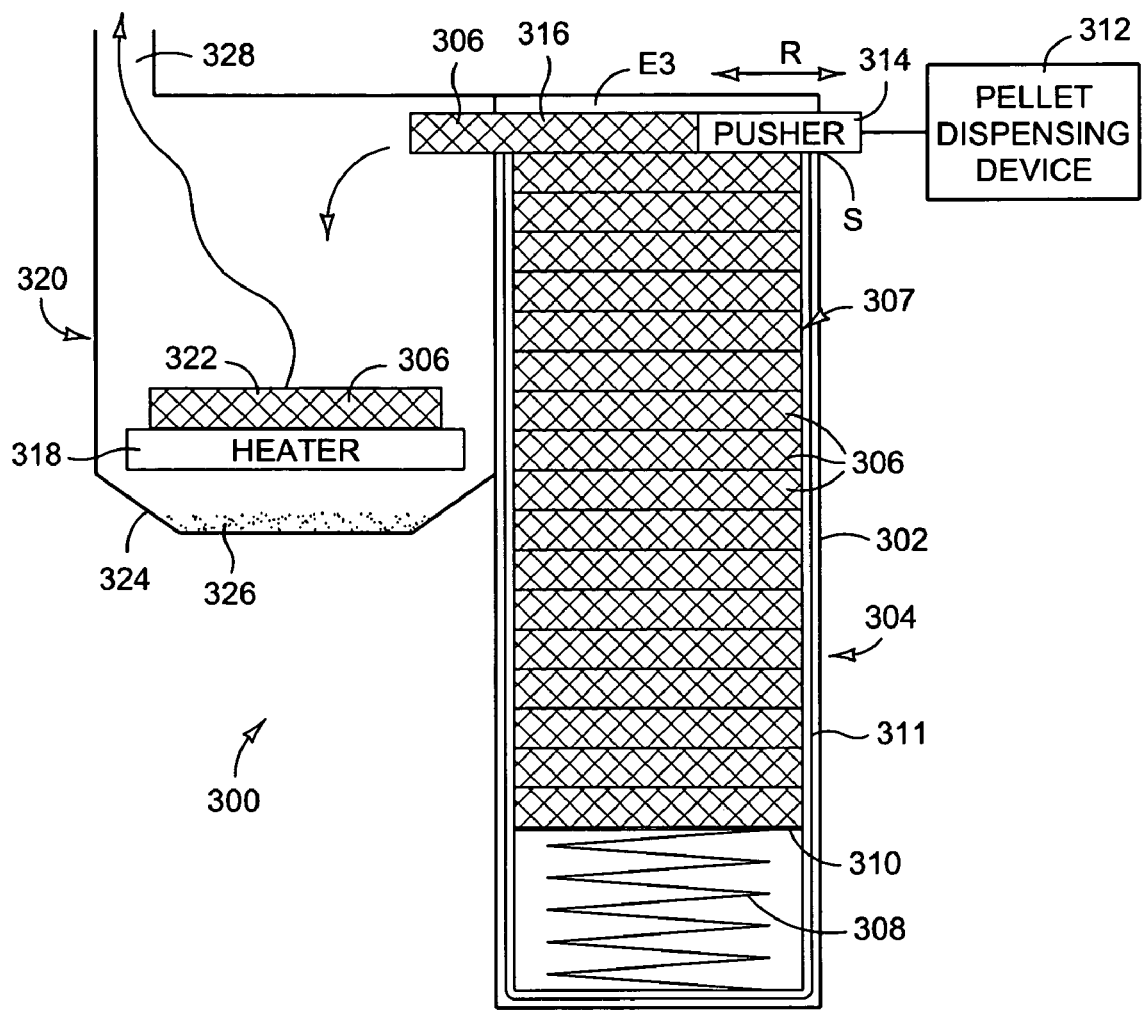
FIG. 3 is a side elevation sectional view depicting a fuel activation device in accordance with a further embodiment of the present invention.

FIG. 3 is a side elevation sectional view depicting a fuel activation device 300 in accordance with another embodiment of the present invention. The fuel activation device 300 includes a housing 302. The housing 302 can be formed from any suitable material such as, for example, plastic, metal, etc. The housing 302 is generally configured to define a fuel storage chamber 304 and a fuel activation chamber 320 (described in further detail hereafter).

The fuel storage chamber 304 is configured to support fuel pellets (described hereafter) for use with fuel activation device 300. In one embodiment (not shown), the fuel storage chamber 304 is configured to support (house) a corresponding replaceable fuel pellet package such as, for example, the fuel pellet package 216 of FIG. 2. In another embodiment, the fuel storage chamber 304 is configured to generally support fuel pellets without the use of a discrete fuel pellet package such that a single use, substantially disposable fuel activation device 300 is defined. Other configurations of the fuel storage chamber 304 corresponding to other embodiments of the fuel activation device 300 can also be used.

The fuel activation device 300 further includes a plurality of fuel pellets 306 substantially arranged as a stack 307. The fuel pellets 306 are defined and configured substantially as described above in regard to the fuel pellets 226 of FIG. 2. In particular, the fuel pellets 306 are configured to release hydrogen gas in response to being heated. The fuel activation device 300 also includes a spring 308 and a contact plate 310 that are respectively defined, configured, and cooperative substantially as described above in regard to the spring 228 and contact plate 230 of FIG. 2. Thus, the spring 308 is generally configured to urge the stack 307 of fuel pellets 306 toward an end "E3" as depicted in FIG. 3.

The fuel activation device 300 also includes an envelope material 311. The envelope material 311 can be formed from any suitable impermeable material such as plastic, Mylar®, etc. As depicted in FIG. 3, the envelope material is open generally in the area of the end E3 such that the fuel pellets 306 can be utilized to produce (i.e., generate or release) hydrogen gas. Therefore, the fuel activation device 300 is generally depicted in FIG. 3 in an active or ready-for-use state. However, it is to be understood that the envelope material 311 is originally configured to define a hermetically sealed envelope (not shown in FIG. 3) prior to the fuel activation device 300 assuming an active state so as to protect the fuel pellets 306 against fluid contaminants.

The fuel activation device 300 further includes a pellet dispensing device 312 mechanically coupled to a pusher element 314. The pellet dispensing device 312 can be defined by any suitable electromechanical assembly configured to transport a fuel pellet 306 (designated as a top pellet 316 in FIG. 3) away from the stack 307 and into the fuel activation chamber 320 under the selective signal control of a suitable, correspondingly coupled, controller (such as the controller 108 of FIG. 1). For example, the pellet dispensing device 312 can include an electrical solenoid or a linear motor (not shown, respectively). Other suitable forms of pellet dispensing device 312 can also be used.

The pusher element 314 can be formed from any suitable material for contact with the fuel pellets 306 such as, for example, plastic, metal, etc. The housing 302 and the pusher 314 cooperate such that a substantially gas-tight seal "S" exists about the pusher element 314. The seal S can include any suitable seal material such as, for example, silicone, etc. The pusher 314 is generally configured to maintain a gas-tight seal S with the housing 302 throughout its respective range of travel "R" during transportation (i.e., impulse pushing or 'kicking') of the top pellet 316 into the fuel activation chamber 320.

In other embodiments (not shown) of the fuel activation device 300, the corresponding pellet dispensing device can be in the form of, for example, a controllable auger, a controllable ratchet wheel, a controlled belt-drive or rotary magazine, etc. Generally, the pellet dispensing devices of the present invention can be defined by any suitable devices or assemblies that are configured to controllably transport fuel pellets 306 from the fuel storage chamber 304 into the fuel activation chamber 320 of the fuel activation device 300. One of skill in the relevant mechanical arts is aware of any number of such suitable devices and mechanisms and can appreciate that suitable embodiments can be selected as desired in accordance with a particular embodiment of the fuel activation device 300. As such, the pellet dispensing device 312 and the associated pusher element 314 are provided herein for exemplary purposes only and are not intended to limit the type of pellet dispensing devices used in the present invention.

The fuel activation device 300 also includes a heater 318 that is supported within the fuel activation chamber 320. The heater 318 is generally referred to as a fuel initiator. The heater 318 can include any suitable heater that is selectively controllable by a correspondingly coupled controller (such as controller 108 of FIG. 1). The heater can include, for example, a power resistor, an electric heating element grid or coil, etc. Other suitable forms of heater 318 can also be used. The heater 318 is generally configured to receive, support and provide controllable (i.e., on-off, selectively variable, or modulating) heat to a fuel pellet 306 designated as an active pellet 322 in FIG. 3. Further elaboration of the heater 318 is provided hereafter.

The fuel activation chamber 320 of the fuel activation device 300 further includes a waste collection area 324 that is disposed generally beneath the heater 318. The waste collection area 324 is generally configured to collect a solid waste product (i.e., material) 326 that results from the activation and consumption of the hydrogen gas provided by the active pellet 322. In one embodiment, the fuel activation device 300 includes one or more operable hatches (not shown) that facilitate the removal of the waste material 326 from waste collection area 324.

The housing 302 of the fuel activation device 300 is further configured to define a gas vent 328. The gas vent 328 is generally configured to fluidly couple hydrogen gas from the fuel activation chamber 320 to a fuel cell (not shown, see fuel cell 102 of FIG. 1) by way of suitable fluid conduit (not shown).

Typical operation of the fuel activation device 300 is as follows: to begin, it is assumed that a suitable controller (not shown, see controller 108 of FIG. 1) is coupled in control signal communication with the pellet dispensing device 312 and the heater 318 of the fuel activation device 300. The controller then issues a signal causing the pellet dispensing device 312 to transport (i.e., impulse push or 'kick') the top pellet 316 from the stack 307 and into the fuel activation chamber 320 by way of the pusher element 314. The top pellet 316 (which, of course, is a fuel pellet 306) then drops under the influence of gravity onto the heater (fuel initiator) 318. The top pellet 316 just transported to the fuel activation chamber 320 now defines the active pellet 322 supported by the heater 318.

Thereafter, the pusher element 314 is withdrawn away from the fuel activation chamber 320 toward the pellet dispensing device 312 until sufficient clearance exits to permit another pellet 306 within the stack 307 to assume the top pellet 316 position under the force influence of the spring 308. The pellet dispensing device 312 and the pusher element 314 are now in a standby state awaiting signal instruction from the controller (not shown) to transport the new top pellet 316 into the fuel activation chamber 320. Thus, pellet dispensing (i.e., transportation from the stack 307 to the fuel activation chamber 320) can be selectively performed in an iterative fashion under signal control by the controller.

The controller (not shown) now issues a signal causing the heater 318 to begin heating the active pellet 322. In response to the heating, the active pellet 322 releases hydrogen gas that substantially fills the balance of the fuel activation chamber 320 and is fluidly coupled to a fuel cell (not shown) by way of gas vent 328. Waste material 326 is produced as a byproduct of the hydrogen gas release from the active pellet 322 and generally falls under the influence of gravity into the waste collection area 324 of the fuel activation chamber 320.

The controller (not shown) continues to cause the heater 318 to provide heat to the active pellet 322 for as long as the controller detects (i.e., senses) that a satisfactory quantity of hydrogen gas is being released thereby. At some time, the controller detects a substantial depletion of the hydrogen content of the active pellet 322 and responds by causing the pellet dispensing device 312 to transport the new top fuel pellet 316 into the fuel activation chamber 320 and consequently onto the heater 318 by way of the pusher element 314, thus defining a new active pellet 322. Heating of the new active pellet 322 continues substantially as described above resulting in the corresponding release of hydrogen gas.

For purposes of example, it is now assumed that the controller (not shown) determines that hydrogen gas is no longer needed by the fuel cell (not shown). In response, the controller ceases signal control of (or otherwise deactivates) the heater 318. As a result, the heater 318 begins to cool toward ambient temperature, with a corresponding eventual end in hydrogen gas production by any remaining fragment of the active pellet 322. Any residual hydrogen gas is assumed to remain stored within the fuel activation chamber 320 and/or associated fluid conduit (not shown) until the next typical operation of the fuel activation device 300. Normal operation of the fuel activation device 300 is now assumed to be in a standby or substantially shut-down condition until reactivated at some future time by the controller.

In another operational example, the fuel activation device 300 is operated substantially as described above, until all of the fuel pellets 306 within the fuel storage chamber 304 have been consumed. At such a time, the supply of fuel pellets 306 can be replenished by reloading the fuel storage chamber 304 or through the installation of a suitable replacement fuel pellet package (such as fuel pellet package 216 of FIG. 2). The particular nature of such a replenishing operation is of course dependent upon the particular embodiment of the fuel activation device 300.

In yet another example, the fuel activation device 300 includes a fuel storage chamber 304 which, in the interest of safety, will not accept the installation of an incompatible type of fuel pellet package (not shown, see the fuel pellet package 216 of FIG. 2). In such an embodiment, for example, the fuel storage chamber 304 and those compatible fuel pellet packages share a common cross-sectional shape that is different than that of other types of fuel pellet package. In a similar alternative example, an electronic identification tag or chip is included with the fuel pellet package that identifies the type of fuel pellets contained therein, wherein the fuel activation device 300 is rendered inoperative in the event that an incompatible fuel pellet package is installed. In any case, such an embodiment of the fuel activation device 300 cannot be accidentally replenished and/or operated with an incompatible type of fuel pellet package.

In still another operational example, the particular fuel activation device 300 is configured substantially as a disposable unitary device and is discarded after the inherent supply of fuel pellets 306 is exhausted (i.e., consumed). Other operational examples corresponding to other embodiments of the fuel activation device 300 can also be performed.

It is to be further understood that certain embodiments of the fuel activation device 300 can also include suitable provision (not shown) for automatically opening a fuel pellet package (see fuel pellet package 216 of FIG. 2). One of skill in the mechanical arts is aware of a number of such suitable means such as, for example, spring-loaded cutting tools, etc., and further elaboration is not required for purposes of understanding the present invention. In other certain embodiments of the fuel activation device 300 the fuel pellet package (not shown) is manually opened by way of suitable tools, perforations formed in the fuel pellet packaging, etc., prior to installation and use within the fuel activation device 300.

In any event, the fuel activation device 300 is suitably configured to permit preparation of the fuel pellets 306 within the storage chamber 304 for substantially automated consumption (i.e., activation and use) within the fuel activation device 300 under the selective control of a controller (such as controller 108 of FIG. 1).

Figure 3A:
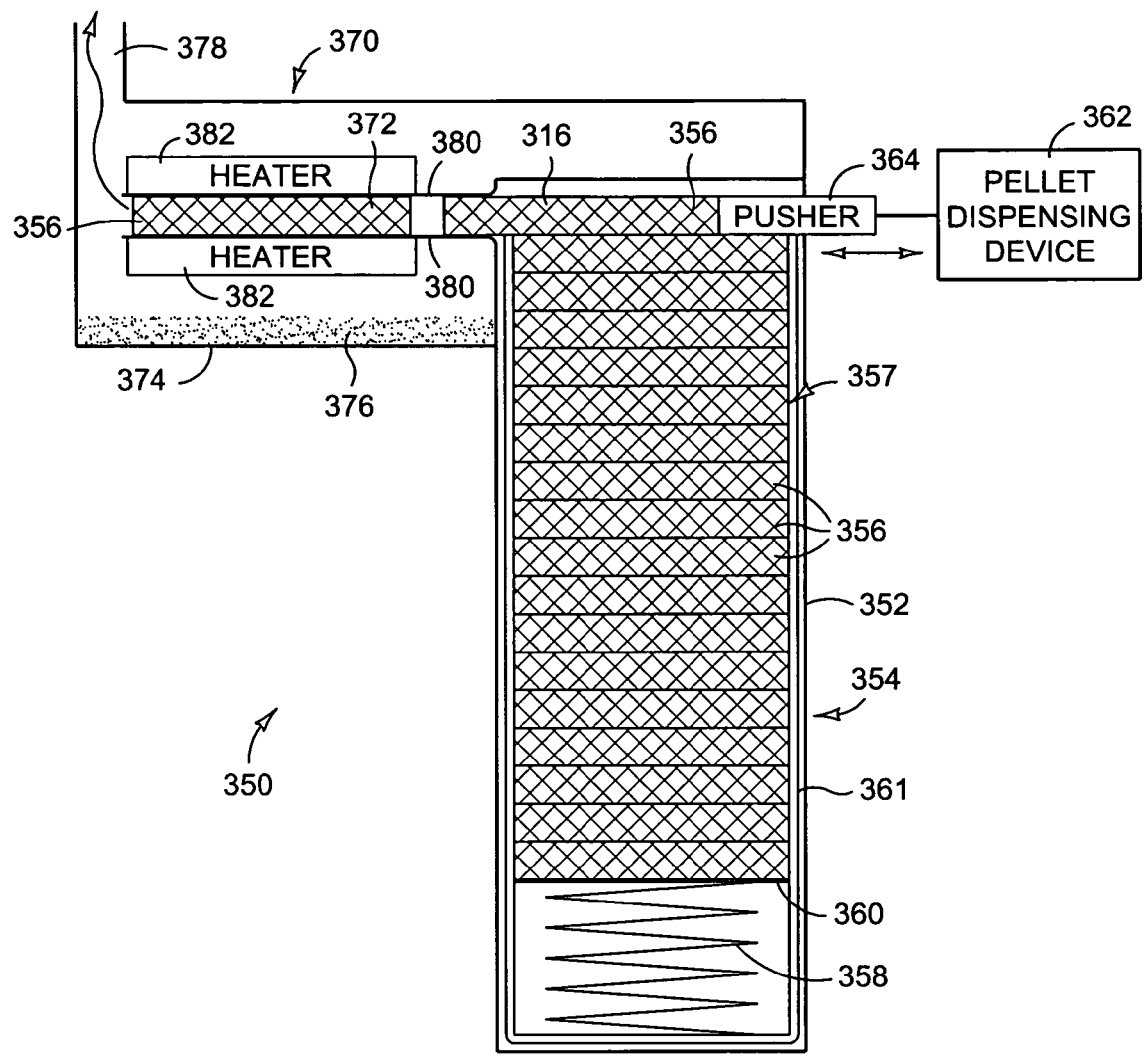
FIG. 3A is a side elevation sectional view depicting a fuel activation device in accordance with still another embodiment of the present invention.

FIG. 3A is a side elevation sectional view depicting a fuel activation device 350 in accordance with still another embodiment of the present invention. The fuel activation device 350 includes a housing 352 defining a fuel storage chamber 354 and a fuel activation chamber 370, a plurality of fuel pellets 356 arranged as a stack 357, a spring 358, and a contact plate 360 that are defined, configured and cooperative substantially as described above in regard to the housing 302 defining the fuel storage chamber 304 and the fuel activation chamber 320, the plurality of fuel pellets 306 arranged as the stack 307, the spring 308, and the contact plate 310, respectively, of the fuel activation device 300 of FIG. 3.

The fuel activation device 350 further includes an envelope material 361, a pellet dispensing device 362, a pusher element 364, and a gas vent 378 that are defined, configured and cooperate substantially as described above in regard to the envelope material 311, the pellet dispensing device 312, the pusher element 314, and the gas vent 328, respectively, of the fuel activation device 300 of FIG. 3.

The fuel activation device 350 further includes a support passage 380. The support passage 380 can be formed from any material suitable for supporting contact with a fuel pellet 306 (designated as active pellet 372 as depicted in FIG. 3A) during heating and release of hydrogen gas there from. For example, the support passage 380 can be formed from stainless steel or another suitable metal, ceramic or a ceramic-coated material, etc. Other materials can also be used. The support passage 380 generally defines a channel leading away from the fuel storage chamber 354 and extending into the fuel activation chamber 370.

The support passage 380 is substantially configured to supportingly (i.e., graspingly) receive the active pellet 372 from the fuel storage chamber 354 by way of the pellet dispensing device 362 and pusher 364 regardless of the orientation (i.e., rotation or disposition) of the fuel activation device 350 with respect to gravity. The support passage 380 is further configured to permit the venting of hydrogen gas from the active pellet 372 into the fuel activation chamber 370 during normal use. As such, the support passage 380 can be provided in a number of suitable embodiments. As depicted in FIG. 3A, the support passage 380 is generally defined by a pair of opposed semi-flexible metal extensions. Other embodiments of the support passage 380 can also be used.

The fuel activation device 350 further includes a heater device (hereafter, heater) 382. The heater 382 is generally referred to as a fuel initiator. As depicted in FIG. 3A, the heater 382 is generally configured as a pair of electric heaters or heating elements respectively supported by the pair of metal extensions defining the support passage 380. The heater 382 can include any suitable heater device or pair of heater devices that is/are configured to controllably heat the active pellet 372 supported within the support passage 380 under the signal control of a suitable controller (such as the controller 108 of FIG. 1). For example, the heater 382 can include a power resistor or resistors, an electric heating element or elements, etc. Other suitable forms of the heater 382 can also be used.

Typical operation of the fuel activation device 350 is as follows: a suitable controller (not shown, see controller 108 of FIG. 1) provides a control signal causing the pellet dispensing device 362 and associated pusher element 364 to impulse push or 'kick' a fuel pellet 356 from the stack 357 into cooperative support with the support passage 380 thus defining an active pellet 372. The controller further causes the heater 382 to heat the active pellet 372 resulting in the corresponding release of hydrogen gas. The released hydrogen gas then generally fills the fuel activation chamber 370 and is fluidly coupled to a fuel cell (such as the fuel cell 102 of FIG. 1) by way of a suitable fluid conduit (not shown) there between.

The heat-activated release of hydrogen gas continues until the controller (not shown) determines (i.e., senses or detects) that the hydrogen content of the active pellet 372 is substantially depleted. At such time, the controller causes the pellet dispensing device 362 and associated pusher element 364 to transport a replacement fuel pellet 356 from the stack 357 within the fuel chamber 354 into cooperative support by the support passage 380. In so doing, waste product 376 is ejected from the support passage 380 by the incoming new active pellet 372 and collects within a waste collection area 374 generally beneath the support passage 380.

Operation of the fuel activation device 350 is assumed to continue substantially as described above, consuming one fuel pellet 356 at a time, until the controller (not shown) determines that no more hydrogen fuel is required. The controller then causes the heater 382 and pellet dispensing device 362 to assume a generally shut-down or standby condition until reactivated at some time in the future. Other operational aspects of the fuel activation device 350 are substantially similar to that described above in regard to the fuel activation device 300 of FIG. 3.

It is to be understood that various embodiments of the fuel activation device 350 can be defined in accordance with particular elements and operating characteristics. For example, one embodiment (not shown) of the fuel activation device 350 includes a fuel storage chamber 354 configured to support and cooperate with a suitable fuel pellet package (such as the fuel pellet package 216 of FIG. 2) so that a refillable fuel activation device 350 is defined. In another example, an embodiment (not shown) of the fuel activation device 350 includes suitable hatches that permit the removal of waste product 376 from the waste collection area 374. In still another example, an embodiment (not shown) of the fuel activation device 350 is provided that is generally configured to be disposable in nature so that the entire fuel activation device 350 can be suitably discarded once the inherent supply of fuel pellets 356 is completely exhausted. In yet another embodiment the fuel activation device 350 can be configured to simultaneously receive or support two or more suitable fuel pellet packages (such as the fuel pellet package 216 of FIG. 2) so that as one pellet package becomes depleted and is being replaced, a second pellet package can be used to thereby maintain a continuous, uninterrupted supply of hydrogen gas. Other particular embodiments (not shown) of the fuel activation device 350 are also anticipated within the scope of the present invention as can be appreciated by one of skill in the relevant arts.

Figure 4:
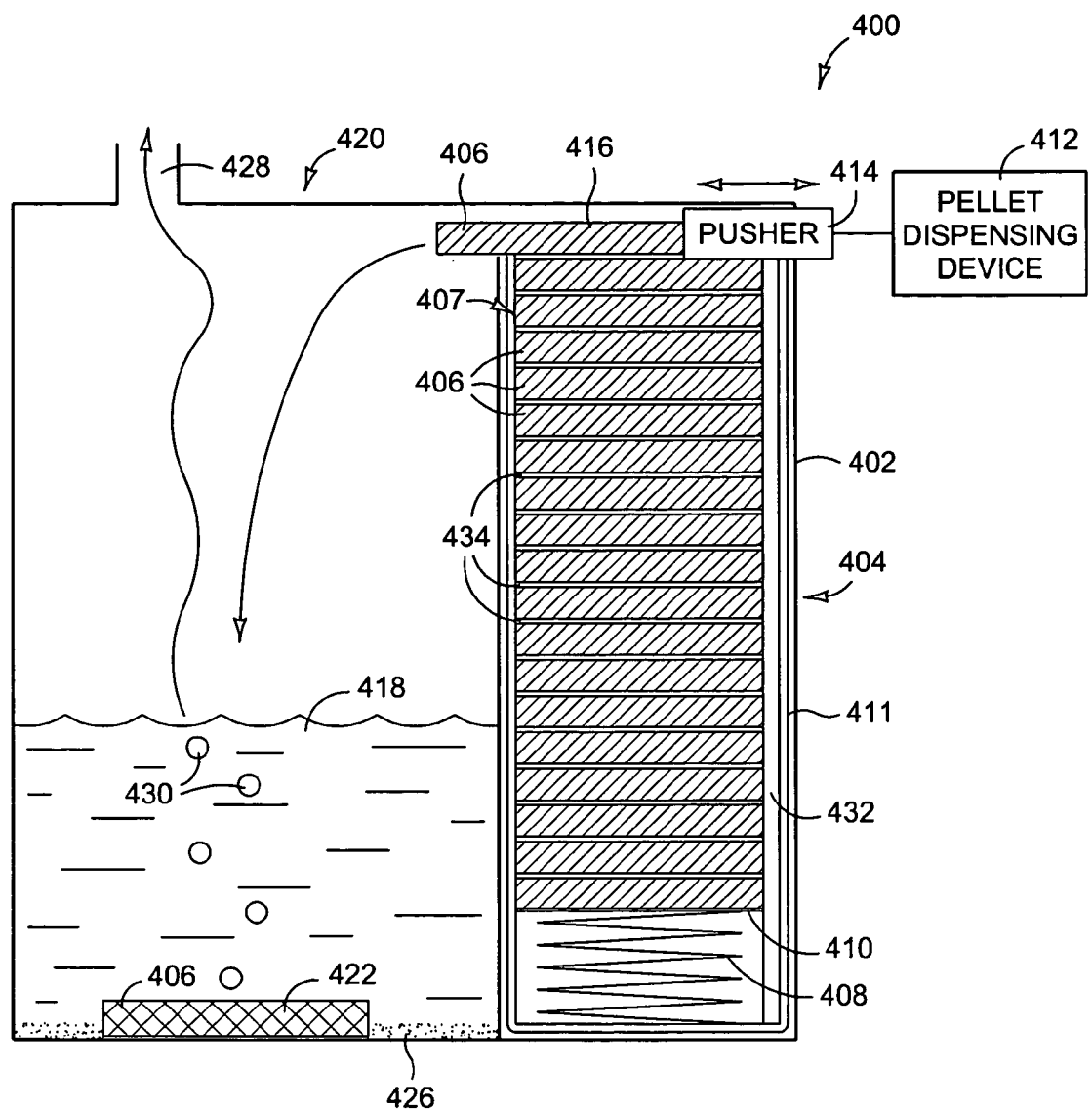
FIG. 4 is side elevation sectional view depicting a fuel activation device in accordance with yet another embodiment of the present invention.

FIG. 4 is side elevation sectional view depicting a fuel activation device 400 in accordance with yet another embodiment of the present invention. The fuel activation device 400 includes a housing 402 defining a fuel storage chamber 404 and a fuel activation chamber 420, a spring 408, and a contact plate 410 that are defined, configured and cooperative substantially as described above in regard to the housing 302 defining the fuel storage chamber 304 and the fuel activation chamber 320, the spring 308, and the contact plate 310, respectively, of the fuel activation device 300 of FIG. 3.

The fuel activation device 400 further includes an envelope material 411, a pellet dispensing device 412, a pusher element 414, and a gas vent 428 that are defined, configured and cooperate substantially as described above in regard to the envelope material 311, the pellet dispensing device 312, the pusher element 314, and the gas vent 328, respectively, of the fuel activation device 300 of FIG. 3.

The fuel activation device 400 also includes a plurality of fuel pellets 406 substantially arranged as a stack 407 within the fuel storage chamber 404. The fuel pellets 406 are defined and configured substantially as described above in regard to the fuel pellets 266 of FIG. 2A. In particular, the fuel pellets 406 are configured to release hydrogen gas in response to contact with a suitable activation liquid, for example, slightly acidic water with $NaBH_4$ pellets (as described above in regard to the fuel pellets 266 of FIG. 2A).

The fuel activation device 400 also includes a desiccant 432. The desiccant 432 is defined, configured and cooperative substantially as described above in regard to the desiccant 272 of FIG. 2A. That is, the desiccant 432 is generally configured to absorb moisture away from the fuel pellets 406 within the fuel storage chamber 404. The fuel activation device 400 further includes a passivating material 434. The passivating material 434 is defined, configured and cooperative substantially as described above in regard to the passivating material 274 of FIG. 2A. Thus, the passivating material 434 is generally configured to prevent the undesired release of hydrogen gas from the fuel pellets 406 due to contact with an activation liquid within the fuel storage chamber 404.

The fuel activation device 400 further includes an activation liquid 418 supported within the fuel activation chamber 420. The activation liquid 418 is generally referred to as a fuel initiator. As depicted in FIG. 4, the activation liquid 418 is assumed to be slightly-acidic water. Other suitable activation liquids 418 can also be used. In any case, the activation liquid 418 is generally configured to activate and perpetuate the release of hydrogen gas from a fuel pellet 406 (designated as active pellet 422 as depicted in FIG. 4) and is of sufficient quantity to substantially completely surround (i.e., immerse) the active pellet 422.

Typical operation of the fuel activation device 400 is as follows: a suitably coupled controller (such as the controller 108 of FIG. 1) causes the pellet dispensing device 412 to impulse push (i.e., transport) a fuel pellet 406 (designated as top pellet 416 as depicted in FIG. 4) into the fuel activation chamber 420 by way of the pusher element 414. The top pellet 416 then generally drops under the influence of gravity into the activation liquid 418, thus defining an active pellet 422.

The activation liquid 418 activates the release of hydrogen gas from the active pellet 422, which rises as gas bubbles 430 generally out of the activation liquid 418 and into the remaining volume of the fuel activation chamber 420. The hydrogen gas is then fluidly coupled to a fuel cell (such as the fuel cell 102 of FIG. 1) by way of the gas vent 428 and a suitable fluid conduit (not shown). A waste product 426 collects within the fuel activation chamber 420 as a result of the hydrogen gas release from the active pellet 422.

The release of hydrogen gas from the active pellet 422 continues until the controller (not shown) detects that the hydrogen content of the active pellet 422 is substantially depleted. The controller then responds to this detected (i.e., sensed) hydrogen depletion by causing the pellet dispensing device 412 to transport a new top pellet 416 into the fuel activation chamber and consequently into immersion (i.e., contact) with the activation liquid 418. In this way, the consumption of (i.e., hydrogen gas release from) a new active pellet 422 is begun. Furthermore, it is to be understood that any portion of the desiccant 432 and/or the passivating material 434 that is incidentally introduced to the activation liquid 418 (typically along with the transported top pellet 416) has no consequential effect on the hydrogen gas release by the active pellet 422 and generally accumulates with the waste product 426.

This typical operation continues substantially as described above, one fuel pellet 406 at a time, until such time that the controller (not shown) ceases to cause the pellet dispensing device 412 and associated pusher element 414 to transport any additional fuel pellets 406 into the fuel activation chamber 420. Any residual hydrogen gas is assumed to be stored within the fuel activation chamber 420 until the next activation of the fuel activation device 400. The fuel activation device 400 is now considered to be in a standby or substantially shut-down state until future use. Therefore, typical operation of the fuel activation device 400 is generally similar to that of the respective fuel activation devices 300 and 350 described above.

It is to be understood that various embodiments of the fuel activation device 400 are anticipated within the scope of the present invention in accordance with particular elements and operating characteristics. For example, one anticipated embodiment (not shown) of the fuel activation device 400 includes a fuel storage chamber 404 configured to support and cooperate with a suitable fuel pellet package (such as the fuel pellet package 256 of FIG. 2A) such that a refillable (i.e., 'rechargeable') fuel activation device 400 is defined. In another example, an embodiment (not shown) of the fuel activation device 400 is provided that includes a suitable hatch or hatches configured such that the activation liquid 418 can be replaced and/or the waste product 426 can be removed from the fuel activation chamber 420. In yet another exemplary embodiment (not shown) a fuel activation device 400 is provided that is configured to supply or replenish, at least in part, the activation liquid 418 by way of waste water produced by an associated fuel cell (such as the waste water W produced the fuel cell 102 of FIG. 1) coupled to the fuel activation device 400. Other embodiments (not shown) of the fuel activation device 400 can also be defined.

Figure 4A:
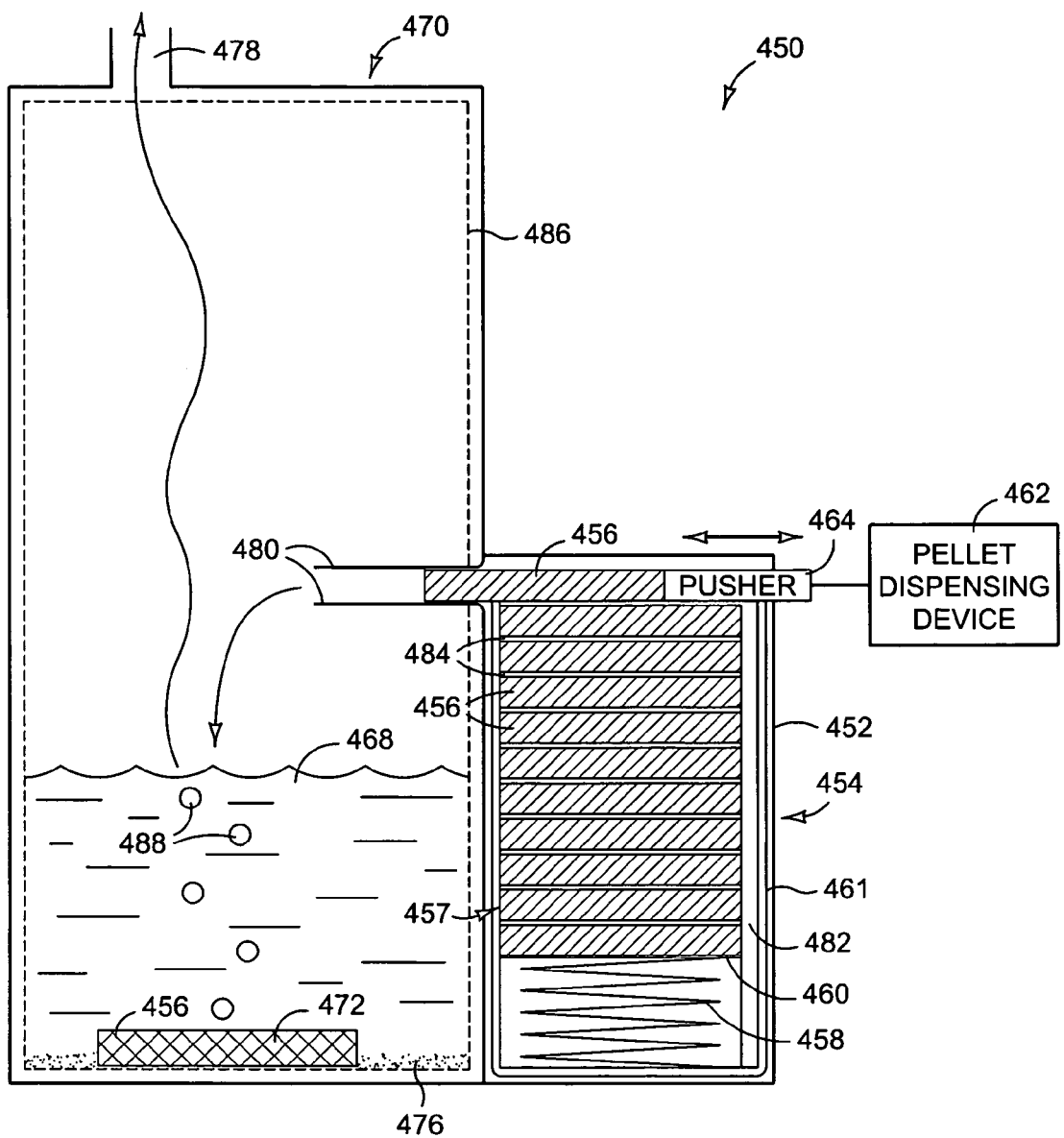
FIG. 4A is a side elevation sectional view depicting a fuel activation device in accordance with still another embodiment of the present invention

FIG. 4A is a side elevation sectional view depicting a fuel activation device 450 in accordance with still another embodiment of the present invention. The fuel activation device 450 includes a housing 452 defining a fuel storage chamber 454 and a fuel activation chamber 470, an activation liquid 468, a spring 458, and a contact plate 460 that are defined, configured and cooperative substantially as described above in regard to the housing 402 defining the fuel storage chamber 404 and the fuel activation chamber 420, the activation liquid 418, the spring 408, and the contact plate 410, respectively, of the fuel activation device 400 of FIG. 4.

The fuel activation device 450 further includes a plurality of fuel pellets 456 arranged as a stack 457, an envelope material 461, a pellet dispensing device 462, a pusher element 464, a desiccant 482, a passivating material 484, and a gas vent 478 that are defined, configured and cooperate substantially as described above in regard to the plurality of fuel pellets 406 arranged as the stack 407, the envelope material 411, the pellet dispensing device 412, the pusher element 414, the desiccant 432, the passivating material 434, and the gas vent 428, respectively, of the fuel activation device 400 of FIG. 4.

The fuel activation device 450 further includes a snorkel tube 480. The snorkel tube 480 can be formed from any suitable material such as, for example, plastic, metal, etc. In one embodiment, the snorkel tube 480 is substantially formed as a portion of the housing 452. Other embodiments of the snorkel tube 480 can be used. The snorkel tube 480 substantially defines a passageway or conduit configured to permit the passage of a fuel pellet 456 from the fuel storage chamber 454 into the fuel activation chamber 470, while preventing the activation liquid 468 from entering (i.e., contaminating) the fuel storage chamber 454 regardless of the orientation of fuel activation device 450 with respect to gravity.

The fuel activation device 450 also includes a hydrophobic membrane 486. The hydrophobic membrane 486 is supported generally within the fuel activation chamber 470 and is configured to substantially trap (i.e., preserve) the activation liquid 468 therein, while permitting hydrogen gas within the fuel activation chamber 470 to pass through the hydrophobic membrane 486 and generally out of the fuel activation device 450 by way of the gas vent 478. The hydrophobic membrane can be formed from any suitable hydrophobic gas-permeable material and is typically formed from Gore-tex®. Gore-tex® is a registered mark owned by W. L. Gore & Associates, Inc., Newark, Del. Other suitable hydrophobic membranes can also be used.

Typical operation of the fuel activation device 450 is as follows: a fuel pellet 456 is transported (i.e., impulse pushed) from the fuel storage chamber 454 through the snorkel tube 480 and into the fuel activation chamber 470 by the pellet dispensing device 462 and associated pusher element 464 in response to a corresponding signal from a suitably coupled controller (such as the controller 108 of FIG. 1). The transported fuel pellet 456 drops under gravitational influence into contact with the activation liquid 468 and thus defines an active pellet 472. The active pellet 472 then releases hydrogen gas as bubbles 488 in response to general immersion within the activation liquid 468.

The bubbles 488 of hydrogen gas rise through the activation liquid 468 and substantially fill the fuel activation chamber 470. The hydrogen gas thereafter passes through the hydrophobic membrane 486 and generally exits the fuel activation device 450 through the gas vent 478. For purposes of example, it is assumed that the hydrogen gas is fluidly coupled to a fuel cell (such as the fuel cell 102 of FIG. 1) by way of a suitable fluid conduit (not shown). A substantially solid waste product 476 is produced as a result of the hydrogen gas release from the active pellet 472 and accumulates within the fuel activation chamber 470.

At some time, the controller (not shown) determines that the active pellet 472 is substantially depleted of hydrogen and provides a signal causing the pellet dispensing device 462 to transport another (i.e., new or replacement) fuel pellet 456 through the snorkel tube 480 and consequently into the activation liquid 468, thereby providing a new active pellet 472. The new active pellet 472 releases hydrogen gas substantially as described above.

At some time thereafter, the controller (not shown) detects that additional hydrogen gas is no longer required from the fuel activation device 450 and ceases to cause the transportation of additional fuel pellets 456 into the fuel activation chamber 470. The fuel activation device 450 is now substantially in a standby or shutdown condition until future reactivation. Any residual hydrogen gas is presumed to be preserved or stored within the fuel activation chamber 470 or an associated fluid conduit (not shown) until such a future reactivation occurs. Typical operation of the fuel activation device 450 is now considered complete for the present time.

It is to be understood that the snorkel tube 480 and the hydrophobic membrane 486 are configured and cooperative such that the fuel activation device 450 is usable (i.e., operable) substantially as described above regardless of the orientation (i.e., rotation, or 'tilt') of the fuel activation device 450 with respect to gravity. Furthermore, the overall quantity of the activation liquid 468 within the fuel activation chamber 470 is generally sufficient to activate and perpetuate hydrogen release from the active pellet 472 (or a succession of active pellets 472), but the activation liquid 468 is generally insufficient to flow or spill into the snorkel tube 480.

Further still, the hydrophobic membrane 486 is configured to support the activation liquid 468 within the fuel activation chamber 470 such that loss of the activation liquid 468 is substantially prevented while permitting the desirable release of hydrogen gas from the fuel activation chamber 470 by way of the gas vent 478. Thus, the fuel activation device 450 provides an embodiment of the present invention that utilizes a liquid-based hydrogen release mechanism (i.e., fuel initiator) that is generally suitable for use in portable or otherwise moving applications such as, for example, electric vehicles, laptop computers, etc.

It is to be understood that various embodiments of the fuel activation device 450 are understood to be within the scope of the present invention in accordance with particular elements and operating characteristics. For example, one embodiment (not shown) of the fuel activation device 450 includes a fuel storage chamber 454 configured to support and cooperate with a suitable fuel pellet package (such as the fuel pellet package 256 of FIG. 2A) such that a refillable (i.e., 'rechargeable') fuel activation device 450 is defined. In another example, an embodiment (not shown) of the fuel activation device 450 is provided that includes a suitable hatch or hatches configured such that the activation liquid 468 can be replaced and/or the waste product 476 can be removed from the fuel activation chamber 470. In yet another exemplary embodiment (not shown), a fuel activation device 450 is provided that is configured to be substantially disposable in nature and is generally discarded after the fuel pellets 456 have been consumed. Other embodiments (not shown) of the fuel activation device 450 can also be defined.

Figure 5:
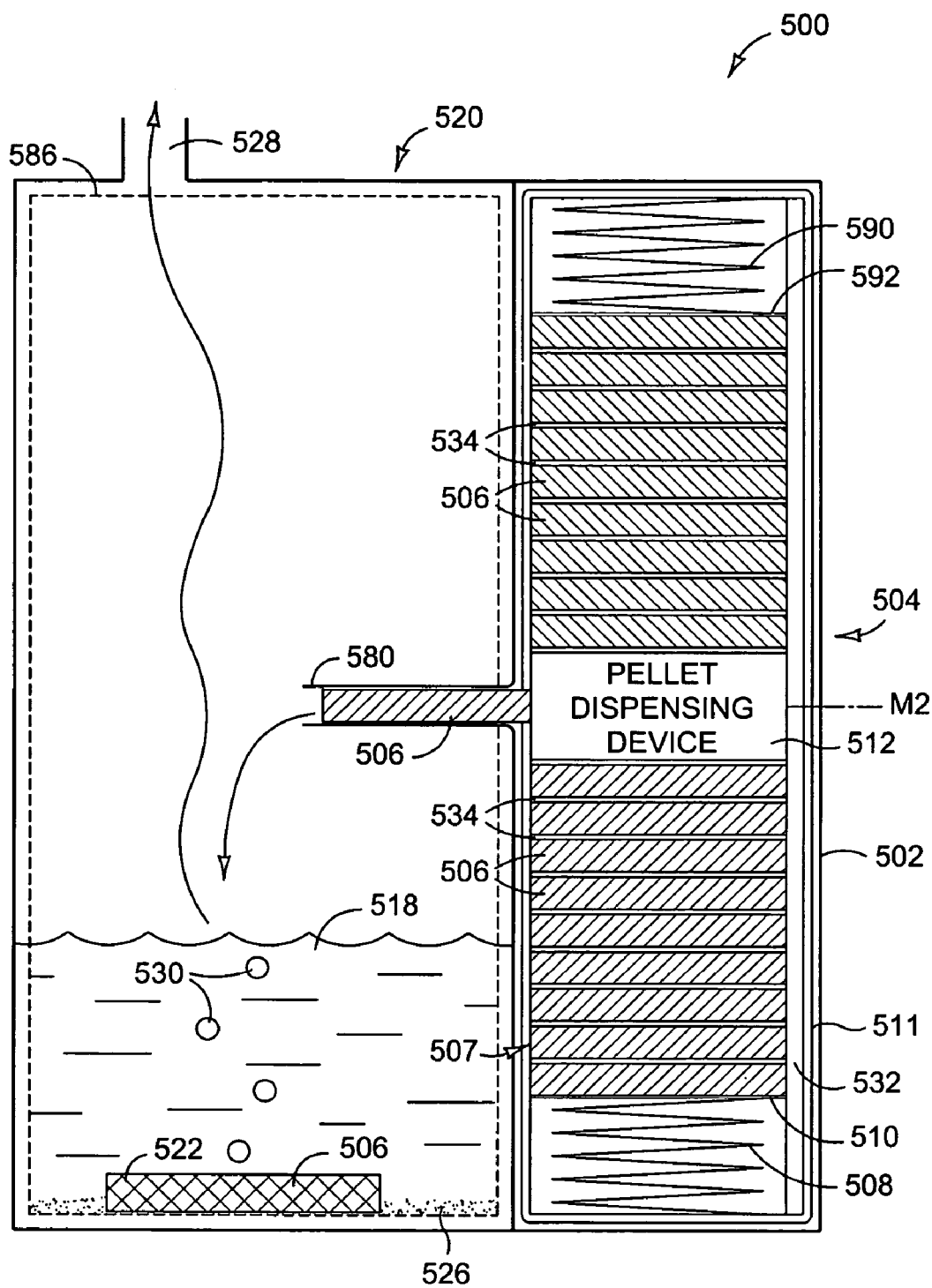
FIG. 5 is a side elevation sectional view depicting a fuel activation device in accordance with yet another embodiment of the present invention.

FIG. 5 is a side elevation sectional view depicting a fuel activation device 500 in accordance with yet another embodiment of the present invention. The fuel activation device 500 includes a housing 502 defining a fuel storage chamber 504 and a fuel activation chamber 520, an envelope material 511, an activation liquid 518, and a gas vent 528 that are defined, configured and cooperative substantially as described above in regard to the housing 402 defining the fuel storage chamber 404 and the fuel activation chamber 420, the envelope material 411, the activation liquid 418, and the gas vent 428, respectively, of the fuel activation device 400 of FIG. 4.

The fuel activation device 500 also includes a pellet dispensing device 512. The pellet dispensing device 512 can include any suitable electromechanical device configured to receive fuel pellets 506 (described hereafter) from a pair of respective feed directions and to selectively transport a fuel pellet 506 into the fuel activation chamber 520 and ultimately into contact with the activation liquid 518 in response to a corresponding signal (i.e., input) from a controller (not shown, see the controller 108 of FIG. 1). One of skill in the electromechanical arts can appreciate that a number of such pellet dispensing devices 512 can be defined and that further elaboration is not required for purposes herein.

The fuel activation device 500 further includes a snorkel tube 580 and a hydrophobic membrane 586 that are defined, configured and cooperative substantially as described above in regard to the snorkel tube 480 and the hydrophobic membrane 486, respectively, of the fuel activation device 450 of FIG. 4A.

The fuel activation device 500 further includes a plurality of fuel pellets 506 (introduced above) arranged as a stack 507, a first spring 508, a first contact plate 510, a second spring 590, a second contact plate 592, a desiccant 532, and a passivating material 534 that are defined, configured and cooperative substantially as described above in regard to the fuel pellets 286 arranged as the stack 287, the first spring 288, the first contact plate 290, the second spring 296, the second contact plate 298, the desiccant 292, and the passivating material 294, respectively, of the fuel pellet package 276 of FIG. 2AA.

As such, the fuel activation device 500 is generally configured such that the respective forces exerted by the first spring 508 and the second spring 590 cooperate to urge the plurality of fuel pellets 506 toward a general midpoint "M2" as depicted in FIG. 5 and into successive cooperative orientation with the pellet dispensing device 512.

Typical operation of the fuel activation device 500 is as follows: a suitable controller (such as the controller 108 of FIG. 1) is assumed to be coupled in controlling relationship with the pellet dispensing device 512. The controller then causes the pellet dispensing device 512 to transport or 'kick' a fuel pellet 506 away from the stack 507 and completely though the snorkel tube 580, at which point the transported fuel pellet 506 drops under the influence of gravity into the activation liquid 518, thus defining an active pellet 522.

The active pellet 522 then releases hydrogen gas as bubbles 530 that rise substantially out of the activation liquid 518. The hydrogen gas substantially fills the balance of the fuel activation chamber 520 and exits the fuel activation device 500 by way of the hydrophobic membrane 586 and the gas vent 528. For purposes of example, it is further assumed that the hydrogen gas is coupled to and consumed by a fuel cell (such as the fuel cell 102 of FIG. 1). The release of hydrogen from the active pellet 522 results in the production of a waste material 526 that generally accumulates in the fuel activation chamber 520.

Eventually, the controller (not shown) senses that the active pellet 522 is substantially depleted of hydrogen and responds by causing the pellet dispensing device 512 to transport another fuel pellet 506 from the fuel storage chamber 504 through the snorkel tube 580 and consequently into the activation liquid 518. In this way, a new active pellet 522 is defined.

The release of hydrogen gas continues from the new active pellet 522 substantially as described above, until such time that the controller (not shown) determines that no more hydrogen gas is required. At this time, the controller ceases to cause the transporting and subsequent activation of additional fuel pellets 506 and the fuel activation device 500 assumes a standby or shut-down operating state until reactivation at some time in the future.

The fuel activation device 500 is generally configured to operate as a source of hydrogen fuel (gas) regardless of orientation with respect to gravity. Furthermore, the cooperation of the first and second springs 508 and 590, respectively, permit the storage and use (i.e., consumption) of a generally greater quantity of fuel pellets 506 relative to, for example, the fuel storage device 450 of FIG. 4A, thereby providing a correspondingly greater quantity of hydrogen fuel. In this way, the fuel activation device 500 is configured to provide generally increased operating times for the various fuel cell based electrical equipment (not shown, see the electrical apparatus 100 of FIG. 1) to which it is applied.

It is to be understood that various embodiments (not shown) of the fuel activation device 500 are understood to be within the scope of the present invention similar to those described above in regard to the fuel activation devices 400 and 450 of FIGS. 4 and 4A, respectively. Therefore, one of skill in the relevant art can appreciate that any number of particular embodiments (not shown) of the fuel activation device 500 can be defined in accordance with required and/or desired elemental features or operating characteristics.

Figure 6:
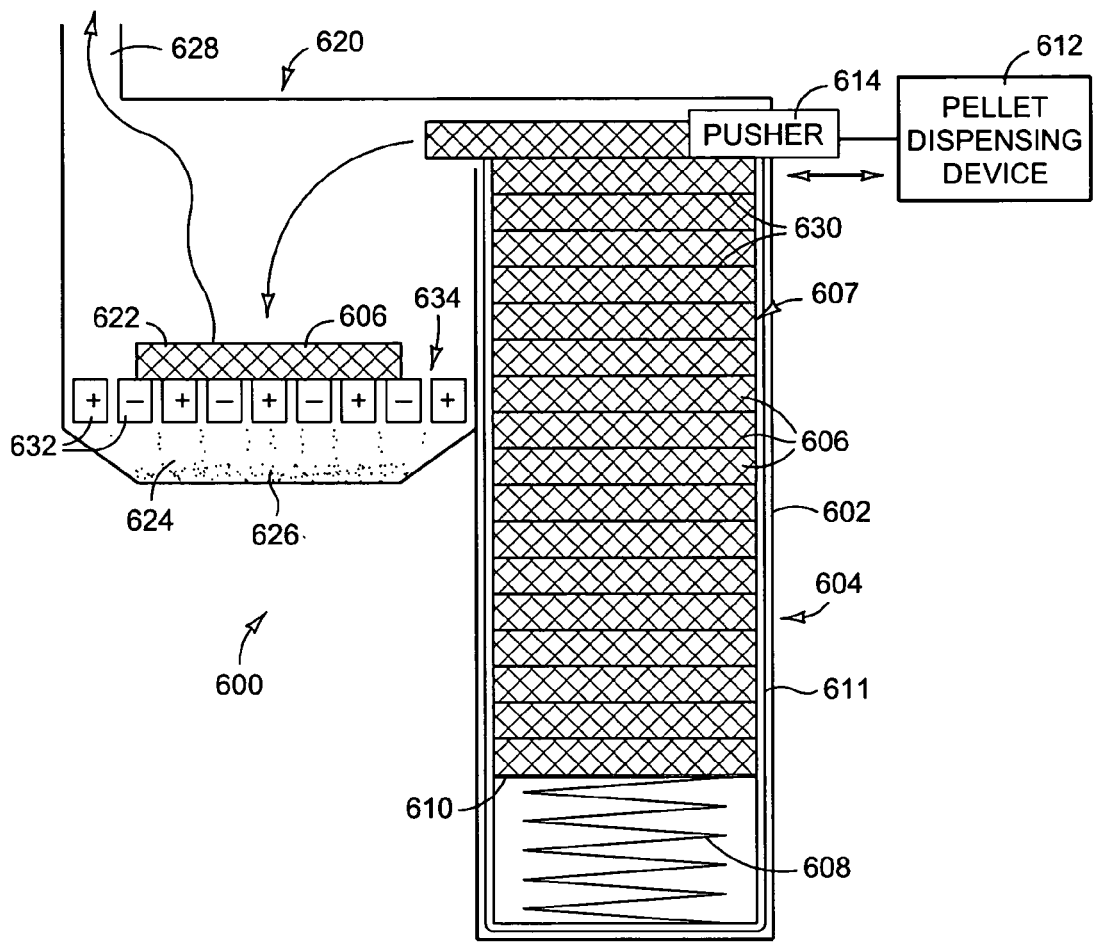
FIG. 6 is a side elevation sectional view depicting a fuel activation device in accordance with another embodiment of the present invention.

FIG. 6 is a side elevation sectional view depicting a fuel activation device 600 in accordance with still another embodiment of the present invention. The fuel activation device 600 includes a housing 602 defining a fuel storage chamber 604 and a fuel activation chamber 620, a plurality of fuel pellets 606 arranged as a stack 607, a spring 608, a contact plate 610, an envelope material 611, a pellet dispensing device 612, a pusher element 614, and a gas vent 628 that are defined, configured and cooperative substantially as described above in regard to the housing 302 defining the fuel storage chamber 304 and the fuel activation chamber 320, the plurality of fuel pellets 306 arranged as the stack 307, the spring 308, the contact plate 310, the envelope material 311, the pellet dispensing device 312, the pusher element 314, and the gas vent 328, respectively, of the fuel activation device 300 of FIG. 3.

In particular, each of the fuel pellets 606 of the fuel activation device 600 includes an electrically conductive coating 630. The electrically conductive coating 630 can be formed from any suitable material such as, for example, polyurethane impregnated with carbon particles. Other suitable electrically conductive materials can also be used. The electrically conductive coating 630 is configured to cause the corresponding fuel pellet 606 to release hydrogen as a gas in response to the application of electrical energy to (i.e., the flow electrical current through) the electrically conductive coating 630. Further elaboration of the electrically conductive coating 630 is provided hereafter.

The fuel activation device 600 further includes a plurality of electrodes 632. As depicted in FIG. 6, each of the electrodes 632 is defined as a generally elongated bar or rod having a substantially rectangular cross-section and extending generally into the page as depicted in FIG. 6. Other geometric forms of electrode 632 can also be used. Each of the electrodes 632 is formed from a suitable electrically conductive material such as, for example, copper, brass, steel, etc. In the alternative (not shown), the electrodes 632 can be formed to include a core (not shown) that supports a coating or plating (not shown) formed from any suitable electrically conductive material such gold, copper, platinum, brass, etc. Other forms of the electrodes 632 can also be formed.

Each of the electrodes 632 is configured to be suitably electrically coupled to an electrical energy source (not shown) such as, for example, the controller 108 of FIG. 1. Such an electrical energy source is typical direct-current in nature. However, an alternating-current electrical energy source can also be used. In any case, the electrodes 632 are mutually arranged such that a grid 634 is defined. The grid 634 is generally referred to as a fuel initiator. As depicted in FIG. 6, the electrodes 632 of the grid 634 are respectively coupled to the electrical energy source (not shown) such that each electrode 632 is of opposite electrical polarity relative to that of the immediately adjacent electrode or electrodes 632. The grid 634 is generally configured to support an active pellet 622. The active pellet is, of course, that fuel pellet 606 that is presently releasing hydrogen gas in response to the application of electrical energy by way of the electrodes 632.

In one embodiment, each of the electrodes 632 of the grid 634 is individually energizable by the electrical energy source (not shown) such that portions of the grid 634 can be selectively energized (i.e., activated) while other portions remain inactive. In this way, the active pellet 622 can be selectively energized and consumed in a portion-by-portion fashion, thus providing a means of regulating or controlling the rate of release of hydrogen gas from the active pellet 622 in general correspondence to the overall percentage of the grid 634 that is presently energized.

In another embodiment, the grid 634 of the electrodes 632 is energized or de-energized in its entirety as selected. Such an embodiment permits regulating the rate of release of hydrogen gas from the active pellet 622 by way of selectively controlling a voltage (or current) applied to the grid 634 by the electrical energy source (i.e., the controller 108 of FIG. 1).

In still another embodiment, the grid 634 of electrodes 632 is configured such that both portions of the grid 634 and the amount of electrical energy (i.e., voltage or current) applied to the grid 634 are individually selectively controllable. Other embodiments (not shown) of the grid 634 corresponding to other embodiments of the fuel activation device 600 can also be provided.

Typical operation of the fuel activation device 600 is as follows: it is assumed that a suitable controller (such as the controller 108 of FIG. 1) is coupled in controlling relationship with the pellet dispensing device 612 and the grid 634 of electrodes 632. The controller then causes the pellet dispensing device 612 and associated pusher element 614 to transport (i.e., kick) a fuel pellet 606 from the stack 607 and into the fuel activation chamber 620 where it falls under gravitational influence onto the grid 634. The fuel pellet 606 now supported by the grid 634 defines the active pellet 622.

The controller (not shown) then causes the electrical energy to be provided to each of the electrodes 632 of the grid 634. The electrodes 632 then couple the electrical energy thus provided to the electrically conductive coating 630 of the active pellet 622. The active pellet 622 responds to this provision of electrical energy by releasing hydrogen gas to the fuel activation chamber 620. Hydrogen gas substantially fills the fuel activation chamber 620 and exits the fuel activation device 600 by way of the gas vent 628. The exiting hydrogen gas is assumed to be fluidly coupled to a fuel cell (not shown, see fuel cell 102 of FIG. 1) by a suitable fluid conduit (not shown) and consumed in the generation of electrical energy.

The release of hydrogen gas from the active pellet 622 results in a general consumption of the active pellet 622 and a corresponding production of a substantially solid waste product 626 that accumulates in a waste collection area 624 of the fuel activation chamber 620. The waste product 626 is inconsequential to the hydrogen gas release by the active pellet 622.

The controller (not shown) is further assumed to generally selectively control the rate of release of the hydrogen gas from the active pellet 622 by way of modulating the voltage of electrical energy applied to the grid 634. Such control can be performed, for example, in response to sensing a terminal voltage of the fuel cell (not shown), sensing the electrical energy demands of an electric load (not shown, see the electric load 106 of FIG. 1), etc.

Eventually, the controller (not shown) detects that the hydrogen content of the active pellet 622 is substantially depleted. The controller responds by causing the pellet dispensing device 612 to transport (or 'kick') another fuel pellet 606 from the fuel storage area 604 and into cooperation with (i.e., electrically coupled support by) the grid 634, thus defining a new active pellet 622. The new active pellet 622 then releases hydrogen gas substantially as described above.

At some time, the controller (not shown) determines that additional hydrogen gas is not required and the controller shuts-down or de-energizes the electrodes 632 of the grid 634. In response, the hydrogen gas release from any remaining portion of the active pellet 622 comes to an end. Any residual hydrogen gas is generally stored within the fuel activation chamber 620 and/or associated fluid conduit (not shown). Furthermore, the controller ceases to cause the pellet dispensing device 612 and pusher element 614 to provide any additional fuel pellets to the grid 634 within the fuel activation chamber 620. The fuel activation device 600 is now considered in a standby or substantially shut-down state until future reactivation by the controller.

It is to be understood that various embodiments of the fuel activation device 600 are understood to be within the scope of the present invention in accordance with particular elements and operating characteristics. For example, one embodiment (not shown) of the fuel activation device 600 includes a fuel storage chamber 604 configured to support and cooperate with a suitable fuel pellet package (such as the fuel pellet package 216 of FIG. 2.) such that a refillable fuel activation device 600 is defined. In another example, an embodiment (not shown) of the fuel activation device 600 is provided that includes a suitable hatch or hatches configured such that the waste product 626 can be removed from the fuel activation chamber 620. In yet another exemplary embodiment (not shown) a fuel activation device 600 is provided that is substantially disposable in nature and is generally intended to be discarded after the fuel pellets 606 have been consumed. Other embodiments (not shown) of the fuel activation device 600 can also be defined.

The fuel activation device 600 of the present invention provides for the storage of hydrogen-containing fuel pellets 606 and the controlled release of hydrogen gas there from for use with a suitably coupled fuel cell. Furthermore, the fuel activation device 600 can be provided to be generally compact in overall size, relatively lightweight, and readily refillable through the use of a correspondingly configured fuel pellet package.

Figure 6A:
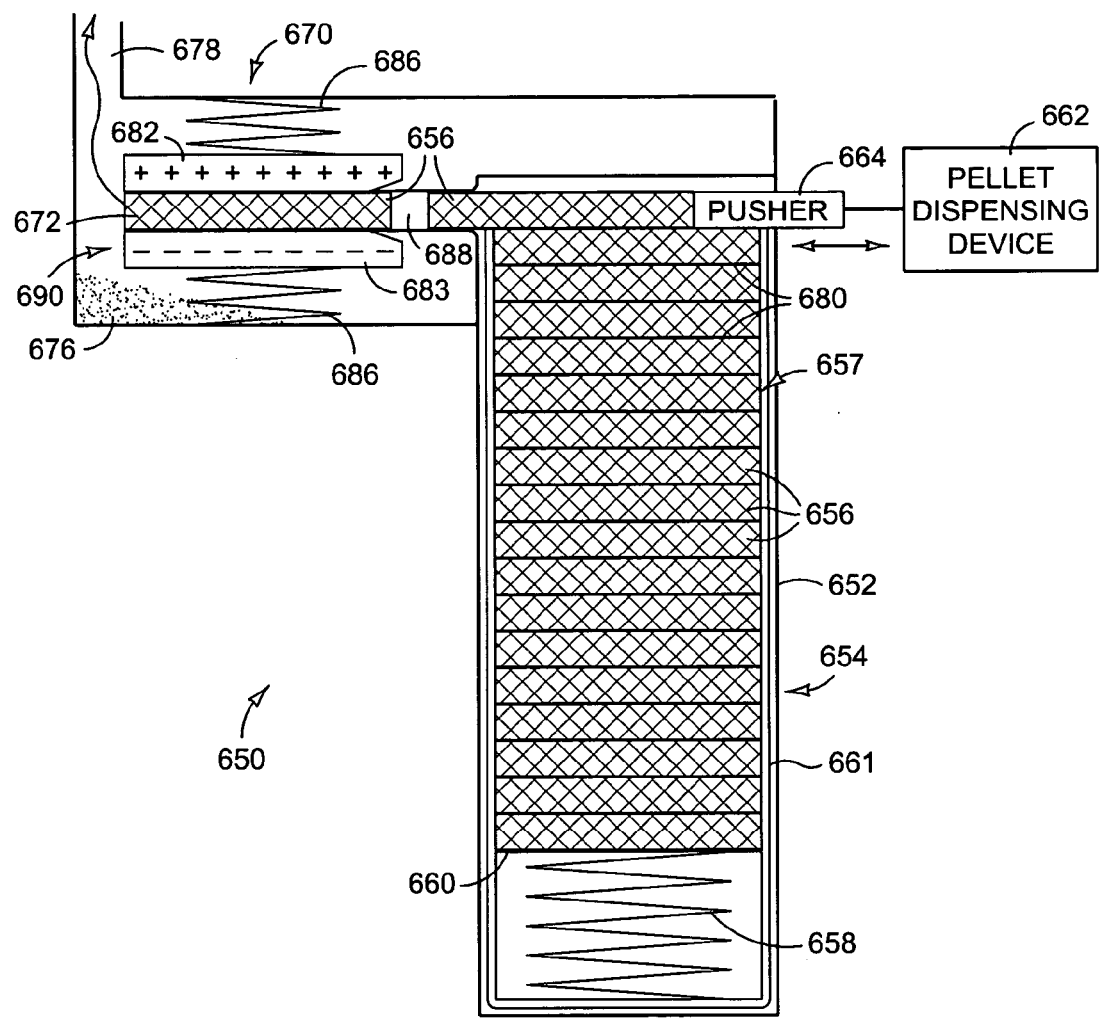
FIG. 6A is a side elevation sectional view depicting a fuel activation device in accordance with still another embodiment of the present invention.

FIG. 6A is a side elevation sectional view depicting a fuel activation device 650 in accordance with still another embodiment of the present invention. The fuel activation device 650 includes a housing 652 defining a fuel storage chamber 654 and a fuel activation chamber 670, a plurality of fuel pellets 656 each including an electrically conductive coating 680 and arranged as a stack 657, a spring 658, a contact plate 660, an envelope material 661, a pellet dispensing device 662, a pusher element 664, and a gas vent 678 that are defined, configured and cooperative substantially as described above in regard to the housing 602 defining the fuel storage chamber 604 and the fuel activation chamber 620, the plurality of fuel pellets 606 each including the electrically conductive coating 630 and arranged as the stack 607, the spring 608, the contact plate 610, the envelope material 611, the pellet dispensing device 612, the pusher element 614, and the gas vent 628, respectively, of the fuel activation device 600 of FIG. 6.

The fuel activation device 650 further includes a first electrode 682 and a second electrode 683. Each of the first and second electrodes 682 and 683 can be formed from any suitable electrically conductive material such as those described above in regard to the electrodes 632 of the fuel activation device 600 of FIG. 6. Other materials can be used to form the first and second electrodes 682 and 683. Each of the first and second electrodes 682 and 683 is configured in the form of a plate or contact bar and is supported in substantially parallel, variably spaced relationship with the other electrode 682 or 683 by way of a corresponding electrode spring 686. The electrode springs 686 can be formed from any suitable substantially resilient, solid material such as, for example, metal, plastic, etc.

The first electrode 682, the second electrode 683, and the electrode springs 686 are mutually configured to define a clamp assembly 690. The clamp assembly 690 is generally referred to as a fuel initiator. The clamp assembly 690 is generally configured to supportingly receive a fuel pellet 656 (designated as an active pellet 672 as depicted in FIG. 6A) and to couple electrical energy from a corresponding source to the active pellet 672 regardless of the orientation or tilt of the fuel activation device 650 with respect to gravity. Such a source of electrical energy is typically in the form of a controller (such as the controller 108 of FIG. 1) suitably electrically coupled to the first and second electrodes 682 and 683. Other forms of electrical energy source can also be used.

It is to be noted that clamp assembly 690 is further configured such that those sides of the active pellet 672 that are not in direct contact with the first and second electrodes 682 and 683 are generally freely exposed to the fuel activation chamber 670. In this way, hydrogen gas released from the active pellet 672 is free to flow from these areas into the fuel activation chamber 670 during normal use (described in detail hereafter).

The fuel activation device 650 also includes a delivery passage 688. The delivery passage is typically defined as a portion of the housing 652 and is therefore formed of like material. In another embodiment (not shown), the delivery passage 688 is formed as a discrete entity from any suitable material (plastic, metal, etc.) and is supported by the housing 602. In any case, the delivery passage is generally configured to permit the sliding delivery of a fuel pellet 656 from the fuel storage chamber 654 and into cooperative engagement with the clamp assembly 690 by way of the pellet dispensing device 662 and pusher element 664.

Typical operation of the fuel activation device 650 is as follows: a suitably coupled controller (not shown, see the controller 108 of FIG. 1) causes the pellet dispensing device 662 and pusher element 664 to transport a fuel pellet 656 from the stack 657 and into engagement with (i.e., electrically conductive support by) the clamp assembly 690. The controller then provides electrical energy to the first electrode 682 and the second electrode 683, which in turn couple the electrical energy to the conductive coating 680 of the active pellet 672.

The active pellet 672 responds to the provision of electrical energy by releasing hydrogen as a gas into the fuel activation chamber 670. The hydrogen gas substantially fills the fuel activation chamber 670 and exits there from by way of the gas vent 678. The controller (not shown) selectively modulates the release rate of the hydrogen gas by way of modulating the voltage or current of the electrical energy provided thereto by the clamp assembly 690.

At some time, the controller (not shown) determines (i.e., detects or senses) that the active pellet 672 is substantially depleted of hydrogen. In response, the controller causes the pellet dispensing device 662 and pusher element 664 to transport or push another (new) fuel pellet 656 from the fuel storage chamber 654 into the engagement (i.e., conductive support) with the clamp assembly 690, thus defining a new active pellet 672. Such transporting of the new active pellet 672 generally results in the forced discharge of solid waste material 676 from the clamp assembly 690. The waste material 676 is substantially inconsequential to the operation of the fuel activation device 600. The new active pellet 672 now releases hydrogen gas in response to the provision of electrical energy by way of the clamp assembly 690.

At some time thereafter, the controller (not shown) senses that additional hydrogen gas is not required. The controller then de-energizes the first and second electrodes 682 and 683 and prevents any additional fuel pellets 656 from being transported to the clamp assembly 690 by the pellet dispensing device 662 and pusher element 664. Any residual hydrogen gas is generally stored within the fuel activation chamber 670 and/or associated fluid conduit (not shown). The fuel activation device 650 is now in a standby or shut-down condition until future reactivation.

Various embodiments of the fuel activation device 650 can be defined in accordance with particular elemental features or operating characteristics as desired or required, or both. For example, an embodiment (not shown) of the fuel activation device 650 can be provided in which the housing 652 defines a fuel storage chamber 654 that cooperatively stores a suitable fuel pellet package such as the fuel pellet package 216 of FIG. 2. In this way, a refillable fuel activation device 650 can be defined.

In another example (not shown), a fuel activation device 650 is defined that includes a suitable hatch or hatches that permit the selective removal of the waste material 676 or the replacement or upgrade of the first and/or second electrodes 682 and 683.

In yet another example (not shown), a fuel activation device 650 is provided that is substantially configured for disposable use—such an embodiment is simply discarded upon consumption (i.e., exhaustion) of the plurality of fuel pellets 656. Other embodiments of the fuel activation 650 can also be defined.

Thus, the fuel activation device 650 of the present invention provides for a hydrogen fuel storage and activation system that is suitable for use with fuel cells. The fuel activation device 650 can be operated in any suitable orientation with respect to gravity or in a substantially gravity-less environment such as a space vehicle. Furthermore, the fuel activation device 650 can be provided in a substantially compact and relatively lightweight arrangement.

Figure 7:
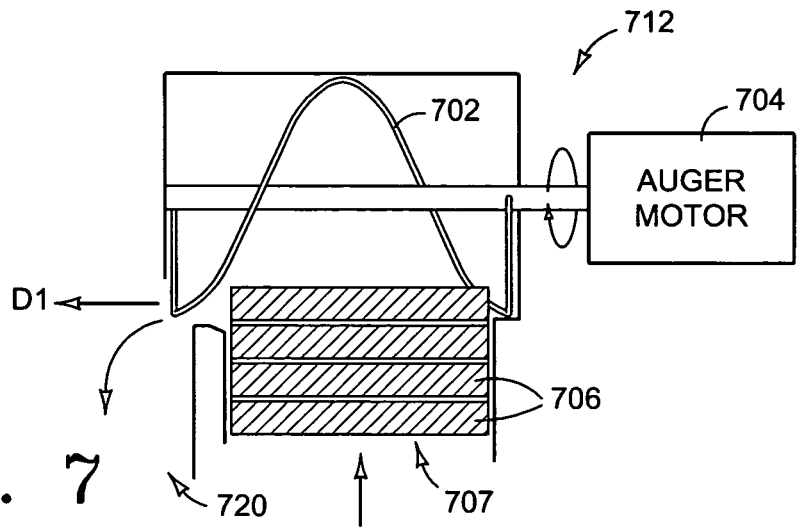
FIG. 7 is side elevation sectional view depicting a pellet dispensing device in accordance with another embodiment of the present invention.

FIG. 7 is side elevation sectional view depicting a pellet dispensing device 712 in accordance with another embodiment of the present invention. The pellet dispensing device 712 includes an auger 702. The auger 702 is configured to transport fuel pellets of the present invention (designated as fuel pellets 706 as depicted in FIG. 7) in a generally lateral direction "D1" away from a spring-loaded stack 707 of such fuel pellets 706 in response to a rotation of the auger 702 by an associated auger motor 704 (described in further detail hereafter). The auger 702 can be formed from any material suitable for contact with the fuel pellets 706 such as, for example, metal, plastic, etc. Other materials can also be used to form the auger 702.

The pellet dispensing device 712 further includes the auger motor 704 introduced above, which is mechanically coupled in rotational driving relationship with the auger 702. The auger motor 704 can include any electric motor suitable for selectively rotating the auger 702 under the signal control of a correspondingly coupled controller (not shown, see the controller 108 of FIG. 1). Typically, the auger motor 704 is a direct-current type of electric motor. Other types of auger motor 704 can also be used.

Typical operation of the pellet dispensing device 712 is as follows: a suitable controller (such as the controller 108 of FIG. 1) is assumed to be coupled in controlling relationship with the auger motor 704. The controller then issues a control signal and/or appropriate electrical power to the auger motor 704 to cause the auger motor 704 to rotate the auger 702 through a full, single rotation and then come to a stop. This single rotation of the auger 702 results in the contacting transportation of a fuel pellet 706 from the stack 707 in the D1 direction into, for purposes of example, a fuel activation chamber 720.

In this way, the controller (not shown) can selectively transport fuel pellets 706 from the stack 707 and into the fuel activation chamber 720 on a time-to-time basis or as a continuously running feed of fuel pellets 706 using the auger 702 and associated auger motor 704.

Figure 8:
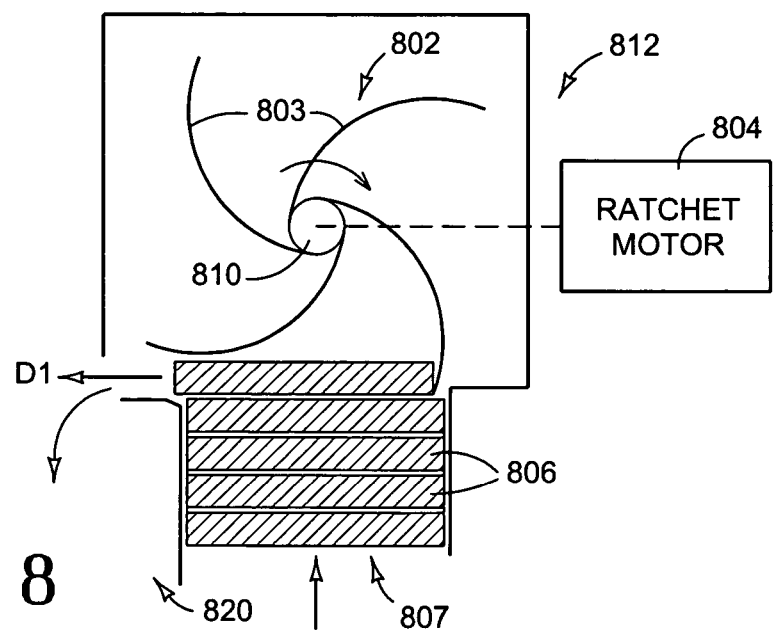
FIG. 8 is a side elevation sectional view of a pellet dispensing device in accordance with yet another embodiment of the present invention.

FIG. 8 is a side elevation sectional view of a pellet dispensing device 812 in accordance with yet another embodiment of the present invention. The pellet dispensing device 812 includes a ratchet wheel 802. The ratchet wheel 802 includes a plurality of semi-flexible paddles 803. The paddles 803 are generally evenly distributed about and supported by a central hub 810. Furthermore, the paddles 803 are supported by the central hub 810 such that each extends in a substantially tangential relationship there from. The ratchet wheel 802 is generally configured to transport fuel pellets 806 away from a spring-loaded stack 807 in a generally lateral direction "D1" in response to a rotation of the ratchet wheel 802 by a ratchet motor 804 (described hereafter). The ratchet wheel 802 can be formed from any suitable material for contact with fuel pellets 806 of the present invention such as, for example, plastic, metal, etc. Other material can also be used to form the ratchet wheel 802. Typical, the central hub 810 and the plurality of paddles 803 are formed such that a continuous, single-piece ratchet wheel 802 is defined.

The pellet dispensing device 812 also includes the ratchet motor 804 introduced above. The ratchet motor 804 is mechanically coupled in rotational driving relationship with the ratchet wheel 802. The ratchet motor 804 can include any electric motor suitable for selectively rotating the ratchet wheel 802 under the signal control of a correspondingly coupled controller (not shown, see the controller 108 of FIG. 1). Typically, the ratchet motor 804 is a direct-current type of electric motor. Other types of ratchet motor 804 can also be used.

Typical operation of the pellet dispensing device 812 is as follows: it is assumed that a suitable controller (such as the controller 108 of FIG. 1) is coupled in controlling relationship with the ratchet motor 804. The controller then issues a control signal and/or appropriate electrical power to the ratchet motor 804 to cause the ratchet motor 804 to rotate the ratchet wheel through about one-quarter turn of rotation (i.e., approximately 90 degrees) and then come to a stop. This quarter-turn rotation of the ratchet wheel 802 results in the contacting transportation of a fuel pellet 806 from the stack 807 in the D1 direction into, for purposes of example, a fuel activation chamber 820.

In this way, the controller (not shown) can selectively transport fuel pellets 806 from the stack 807 and into the fuel activation chamber 820 in substantially the same fashion or fashions as described above in regard to the pellet dispensing device 712 of FIG. 7.

Figure 9:
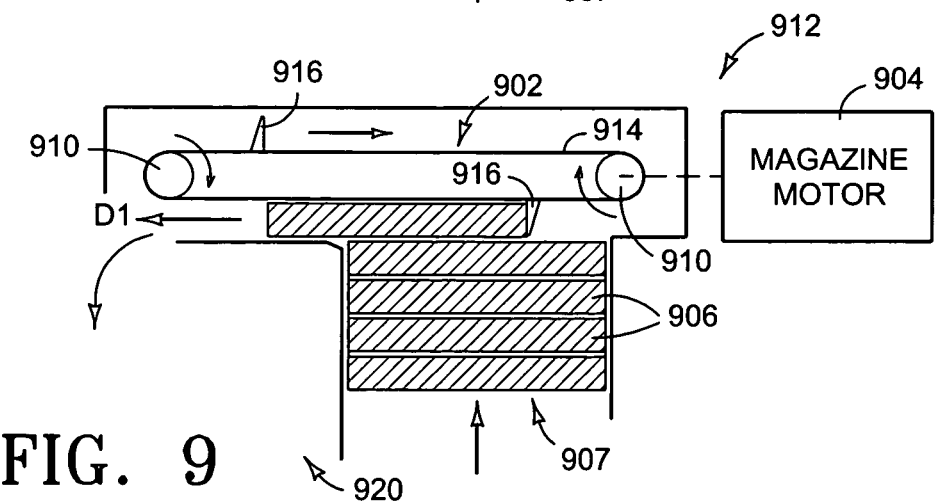
FIG. 9 is a side elevation sectional view depicting a pellet dispensing device in accordance with a further embodiment of the present invention.

FIG. 9 is a side elevation sectional view depicting a pellet dispensing device 912 in accordance with yet another embodiment of the present invention. The pellet dispensing device 912 includes a feed magazine assembly 902. The feed magazine assembly 902 includes a pair of rollers 910. The rollers 910 can be formed from any suitable material such as plastic, metal, etc. The rollers 910 are supported in a generally spaced-apart relationship and support a belt 914. The belt 914 can be formed from any suitable substantially flexible material such as rubber, silicone, etc. Other respective materials for forming the pair of roller 910 and the belt 914 can also be used.

The feed magazine assembly further includes a plurality of push extensions 916. The push extensions 916 can be formed from any material suitable for contact with fuel pellets 906 of the present invention such as, for example, plastic, metal, etc. Each of the push extensions 916 is supported by the belt 914 and is configured to extend generally away there from. Further elaboration of the feed magazine assembly 902 is provided hereafter.

The pellet dispensing device 912 also includes a magazine motor 904. The magazine motor 904 is mechanically coupled in rotational driving relationship with one of the pair of rollers 910. The magazine motor 904 can include any suitable electric motor configured to selectively rotate the coupled roller 910 in response to a control signal and/or appropriate electrical power provided by a suitably coupled controller (not shown, see the controller 108 of FIG. 1). Typically, the magazine motor 904 is a direct-current type of motor. Other types of magazine motor 904 can also be used.

The feed magazine assembly 902 is generally configured such that rotation of the correspondingly coupled roller 910 by the magazine motor 904 results in the feed rotation of the belt 914 about the pair of rollers 910. This rotation of the belt 914 results in the corresponding procession of the plurality of push extensions 916 about the pair of rollers 910, as well. In this way, the feed magazine assembly 902 is substantially configured to laterally transport a fuel pellet 906 in a generally lateral direction "D1" in response to the rotational drive of the feed magazine assembly 902 provided by the motor 904.

Typical operation of the pellet dispensing device 912 is as follows: a suitably coupled controller (not shown) issues a signal and/or operative power to the magazine motor 904 resulting in the controlled rotation thereof. The magazine motor 904 in turn drives the rotation of the belt 914 and the procession of the push extension 916 about the rollers 910. One of the push extensions 916 comes into contact with a fuel pellet 906 and transports it away from the stack 907 in the D1 direction. Ultimately, the transported fuel pellet 906 is delivered free from the feed magazine assembly 902 and is presumed, for purposes of example, to fall under the influence of gravity into a fuel activation chamber 920.

In this way, the controller (not shown) can selectively transport fuel pellets 906 from the stack 907 and into the fuel activation chamber 920 in substantially the same fashion or fashions as described above in regard to the pellet dispensing device 712 of FIG. 7.

It is to be understood that the respective pellet dispensing devices 712, 812 and 912 just described are exemplary of the various embodiments of pellet dispensing devices anticipated by the present invention. It can be appreciated by one of skill in the mechanical arts that other suitable embodiments (not shown) of pellet dispensing devices can also be defined and used within the context herein and that a fully exhaustive description of such other embodiments (not shown) is not required for purposes of understanding the scope of the present invention.

The present invention further provides various methods for providing hydrogen fuel to a fuel cell or cells. One such method includes a number of steps, as follows: a plurality of fuel pellets, each including hydrogen, are provided. The fuel pellets are then arranged as a spring-loaded stack (see the stack 307 of fuel pellets 306 of FIG. 3). Thereafter, a fuel pellet is transported from the stack (see the pellet dispensing device 312 of FIG. 3). Typically, the transported fuel pellet is presently the fuel pellet on the spring-loaded stack, which is transported into cooperative engagement with a suitable fuel initiator (see the heater 318 of FIG. 3). Then, the release of hydrogen gas from the transported fuel pellet is activated. The hydrogen gas is then provided to the fuel cell, generally for purposes of generating electrical energy (see electrical apparatus 100 of FIG. 1).

Other methods of the present invention respectively provide for the packaging of fuel pellets for use with fuel cells. One such method includes the following steps: providing a packaging that defines a chamber or inner space, which supports an impermeable material within (see the packaging 220 and envelope 224 of FIG. 2). Next, a plurality of fuel pellets, each including hydrogen, are supported as a stack within the impermeable material (see the fuel pellets 226 of FIG. 2). Thereafter, the impermeable material is sealed such that a hermetically sealed envelope is defined about (i.e., around or containing) the stack of fuel pellets. Thereafter, the chamber defined by the packaging is sealed about the hermetically sealed envelope (see the fuel pellet package 216 of FIG. 2).

Other methods consistent with the present invention can also be performed. While the exemplary methods described above recite respective steps and orders of execution, it is to be understood that other suitable methods including other steps and/or orders of execution can also be used. While the above methods and apparatus have been described in language more or less specific as to structural and methodical features, it is to be understood, however, that they are not limited to the specific features shown and described, since the means herein disclosed comprise preferred forms of putting the invention into effect. The methods and apparatus are, therefore, claimed in any of their forms or modifications within the proper scope of the appended claims appropriately interpreted in accordance with the doctrine of equivalents.

We claim:

1. A fuel pellet package for use with a fuel activation device for a fuel cell, the fuel pellet package comprising:
   a packaging;
   a hermetically sealed envelope supported within the packaging;
   a plurality of fuel pellets, each including hydrogen releasable by the fuel activation device, wherein the fuel pellets are arranged as a stack within the hermetically sealed envelope; and
   a first spring configured to exert a first force coupled to the fuel pellets.

2. The fuel pellet package of claim 1, and wherein the packaging and the hermetically sealed envelope are each configured to be selectively openable in response to a predefined action.

3. The fuel pellet package of claim 2, and wherein the predefined action includes usably coupling the fuel pellet package with the fuel activation device.

4. The fuel pellet package of claim 2, and wherein the predefined action includes usably coupling the fuel pellet package with a pellet dispensing device of the fuel activation device.

5. The fuel pellet package of claim 1, and further comprising a desiccant configured to absorb moisture away from the plurality of fuel pellets.

6. The fuel pellet package of claim 1, and further comprising a layer of passivating material disposed between each of adjacent ones of the plurality of fuel pellets, the passivating material configured to prevent moisture from releasing the hydrogen from the fuel pellets.

7. The fuel pellet package of claim 1, and wherein the first spring is further configured to advance the fuel pellets in a predefined direction in response to a removal of a fuel pellet from the stack.

8. The fuel pellet package of claim 1, and further comprising a second spring configured to exert a second force coupled to the fuel pellets in a direction substantially opposite to that of the first force, and wherein the first spring and the second spring are each further configured to advance the fuel pellets in respective predefined directions in response to a removal of a fuel pellet from the stack.

9. The fuel pellet package of claim 1, and wherein each of the fuel pellets is configured to release the hydrogen as a gas in response to contact with an activation liquid.

10. The fuel pellet package of claim 9, and wherein each of the fuel pellets is further configured such that the activation liquid is acidic water.

11. The fuel pellet package of claim 1, and wherein each of the fuel pellets is configured to release the hydrogen as a gas in response to providing electrical energy to an electrically conductive outer coating of the fuel pellet.

12. The fuel pellet package of claim 1, and wherein each of the fuel pellets is configured to release the hydrogen as a gas in response to heating the fuel pellet.

13. The fuel pellet package of claim 1, and wherein each of the fuel pellets includes at least one of $NaBH_4$, $CaH_4$, or a zeolite.

* * * * *